United States Patent
Deng et al.

(10) Patent No.: US 12,185,361 B2
(45) Date of Patent: *Dec. 31, 2024

(54) METHODS AND APPARATUS FOR SIDELINK INTER-WIRELESS TRANSMIT/RECEIVE UNIT (WTRU) COORDINATION

(71) Applicant: InterDigital Patent Holdings, Inc., Wilmington, DE (US)

(72) Inventors: Tao Deng, New York, NY (US); Tuong Hoang, Montreal (CA); Martino Freda, Laval (CA); Moon Il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,765

(22) Filed: Jun. 11, 2024

(65) Prior Publication Data
US 2024/0334470 A1    Oct. 3, 2024

Related U.S. Application Data

(63) Continuation of application No. 17/917,042, filed as application No. PCT/US2021/026352 on Apr. 8, 2021.

(Continued)

(51) Int. Cl.
*H04W 4/00* (2018.01)
*H04W 72/40* (2023.01)
*H04W 72/56* (2023.01)

(52) U.S. Cl.
CPC ........... *H04W 72/56* (2023.01); *H04W 72/40* (2023.01)

(58) Field of Classification Search
CPC .............................. H04W 72/56; H04W 72/40
(Continued)

(56) References Cited

U.S. PATENT DOCUMENTS 11,546,923 B2   1/2023   Kaur et al.
11,570,827 B2   1/2023   Lee et al.
(Continued)

FOREIGN PATENT DOCUMENTS

WO   WO 2020/033088 A1   2/2020
WO   WO 2020/060332 A1   3/2020

OTHER PUBLICATIONS

3rd Generation Partnership Project (3GPP), "Discussion on resource allocation mechanism for NR V2X", LG Electronics, R1-1900650, 3GPP TSG RAN WG1 Ad-Hoc Meeting 1901, Taipei, Taiwan, Jan. 2019, 13 pages.

(Continued)

*Primary Examiner* — Marceau Milord
(74) *Attorney, Agent, or Firm* — Flaster Greenberg, P.C.

(57) ABSTRACT

Methods, apparatus, systems, architectures, and interfaces for a wireless transmit receive unit (WTRU) performing sidelink communications are provided. A method may include any of: receiving SL transmission configuration information indicating: (1) a dedicated resource allocation for assistance transmissions, and (2) triggering conditions for performing an assistance transmission; on condition that: (i) a physical SL shared channel (PSSCH) transmission is received, by the WTRU from another WTRU, according to a semi-persistent reservation, and (ii) one or more of the triggering conditions for performing the assistance transmission has occurred: (a) performing sensing based on sensing parameters associated with the received PSSCH transmission, and (b) selecting a dedicated resource allocation according to a resource of the received PSSCH transmission;

(Continued)

and transmitting, to any number of proximate WTRUs, an assistance transmission using the selected dedicated resource allocation, the assistance transmission including assistance information associated with the sensing performed by the WTRU.

16 Claims, 8 Drawing Sheets

Related U.S. Application Data

(60) Provisional application No. 63/091,459, filed on Oct. 14, 2020, provisional application No. 63/061,457, filed on Aug. 5, 2020, provisional application No. 63/007,003, filed on Apr. 8, 2020.

(58) Field of Classification Search
USPC .......................................................... 370/329
See application file for complete search history.

(56) References Cited

U.S. PATENT DOCUMENTS

| | | | |
|---|---|---|---|
| 11,588,656 B2 | 2/2023 | Qiao et al. | |
| 11,716,648 B2* | 8/2023 | Baghel | H04W 28/0236 370/235 |
| 11,832,238 B2* | 11/2023 | Gulati | H04W 72/21 |
| 11,963,207 B2* | 4/2024 | Yu | H04W 72/53 |
| 12,010,018 B2 | 6/2024 | Sun et al. | |
| 12,052,594 B2 | 7/2024 | Lee et al. | |
| 2015/0215903 A1* | 7/2015 | Zhao | H04W 8/005 370/329 |
| 2018/0359795 A1 | 12/2018 | Baek et al. | |
| 2019/0082423 A1* | 3/2019 | Zhao | H04W 72/541 |
| 2019/0222489 A1 | 7/2019 | Shan | |
| 2019/0306835 A1 | 10/2019 | Hoang et al. | |
| 2020/0037190 A1 | 1/2020 | Wu et al. | |
| 2021/0084672 A1* | 3/2021 | Gulati | H04W 56/00 |
| 2021/0105661 A1* | 4/2021 | Baghel | H04W 28/0236 |
| 2022/0053496 A1* | 2/2022 | Yu | H04W 72/20 |
| 2022/0303932 A1 | 9/2022 | Issakov et al. | |
| 2022/0303952 A1 | 9/2022 | Hoang et al. | |
| 2022/0312422 A1 | 9/2022 | Lee et al. | |

OTHER PUBLICATIONS

3rd Generation Partnership Project (3GPP), "New WID on NR sidelink enhancement", LG Electronics, RP-193231, 3GPP TSG RAN Meeting #86, Sitges, Spain, Dec. 2019, 6 pages.

R1-1906796, "Sidelink Resource Allocation Mode-2 Design for NR V2X Communication", 3GPP TSG RAN WG1 Meeting #97 Intel Corporation, May 13-17, 2019, 18 pages.

R1-2007788, "Considerations on Inter-UE Coordination for Mode 2 Enhancements", 3GPP TSG RAN WG1 Meeting #103-E, Oct. 26-Nov. 13, 2020, 20 pages.

\* cited by examiner

METHODS AND APPARATUS FOR SIDELINK INTER-WIRELESS TRANSMIT/RECEIVE UNIT (WTRU) COORDINATION

CROSS-REFERENCE TO RELATED APPLICATIONS

This application is a continuation of U.S. Non-Provisional patent application Ser. No. 17/917,042, filed Oct. 5, 2022, which is the 371 National Stage of International Application No. PCT/US2021/026352, filed Apr. 8, 2021, which claims priority to U.S. Provisional Patent Application Nos. 63/091,459, filed Oct. 14, 2020; 63/061,457, filed Aug. 5, 2020; and 63/007,003, filed Apr. 8, 2020; the disclosures of which are incorporated herein by reference in their entireties.

BACKGROUND

The present invention relates to the field of communications and, more particularly, to methods, apparatus, systems, architectures and interfaces for communications in an advanced or next generation wireless communication system, including communications carried out using a new radio and/or new radio (NR) access technology and communication systems. NR access technology and communication systems may include (e.g., be used for) vehicular communications (V2X), for example, for communication between any of automobiles, infrastructure, pedestrians, and/or networks, on a roadway, wireless transmit/receive units (WTRUs) may (e.g., directly) communicate with each other.

V2X scenarios include: (1) an in-coverage scenario, wherein a WTRU may receive assistance from a network in order to start transmitting and receiving vehicular communication messages; and (2) an out-of-coverage scenario, wherein a WTRU may use pre-configured parameters to start transmitting and receiving vehicular communication messages. V2X services include: (1) Vehicle to Vehicle (V2V): vehicular WTRUs may communicate directly with each other; (2) Vehicle to infrastructure (V2I): vehicular WTRUs may communicate with any of road-side units (RSUs) or base stations (BSs), such as enhance NodeBs (eNBs) or other access points; (3) Vehicle to Network (V2N): vehicular WTRUs may communicate with a core network; and (4) Vehicle to Pedestrian (V2P): vehicular WTRUs may communicate with UEs associated with pedestrians under certain and/or special conditions, e.g. low battery capacity. Furthermore, V2X use cases may include Enhanced Mobile Broadband (eMBB), Massive Machine Type Communications (mMTC) and Ultra Reliable and Low Latency Communications (URLLC). Different use cases may focus on different requirements, such as higher data rate, higher spectrum efficiency, low power and higher energy efficiency, lower latency and higher reliability, etc.

BRIEF DESCRIPTION OF THE DRAWINGS

A more detailed understanding may be had from the following description, given by way of example in conjunction with the accompanying drawings, wherein like reference numerals in the figures indicate like elements, and wherein.

EXAMPLE NETWORKS FOR IMPLEMENTATION OF THE EMBODIMENTS

Figure 1A:
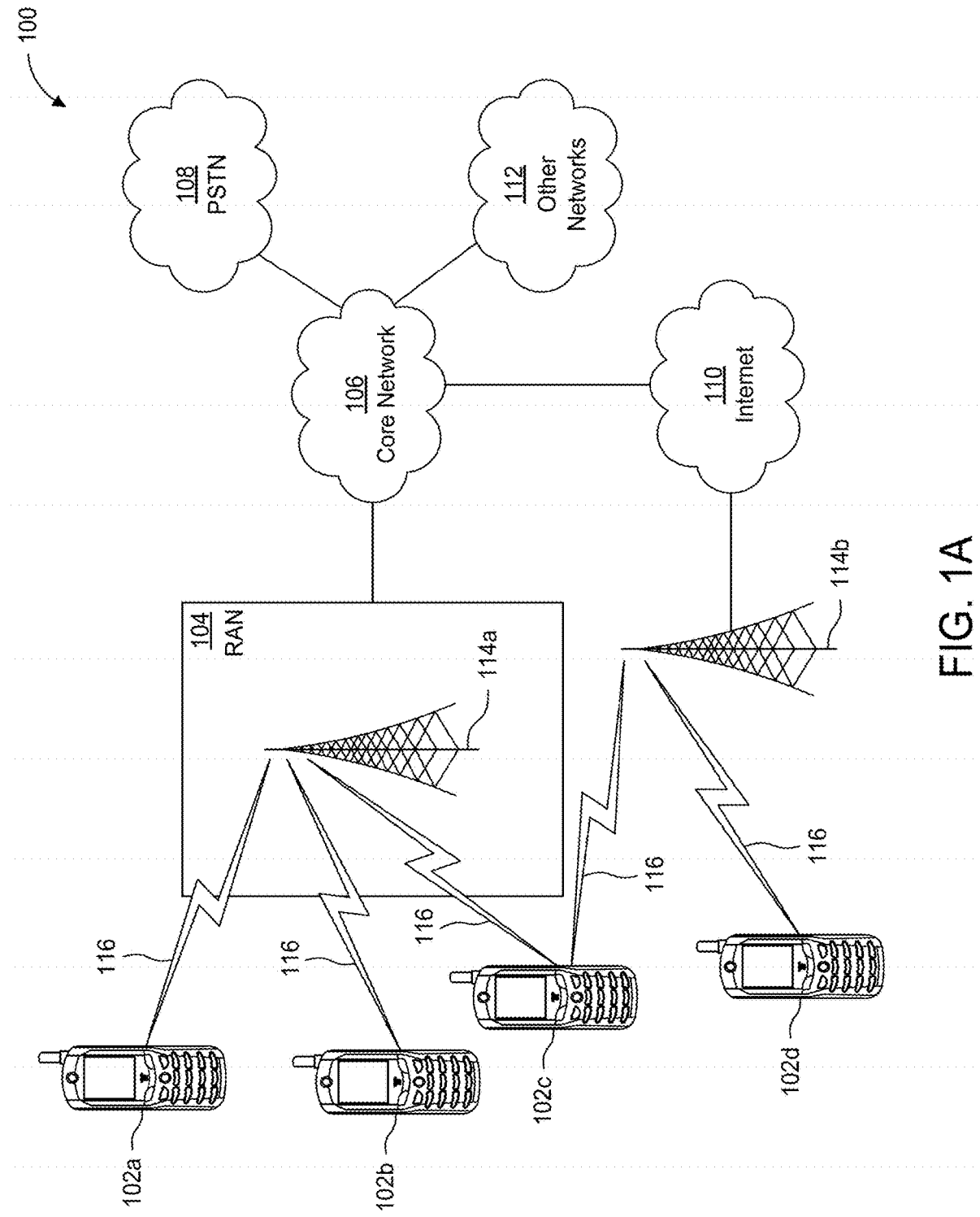
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
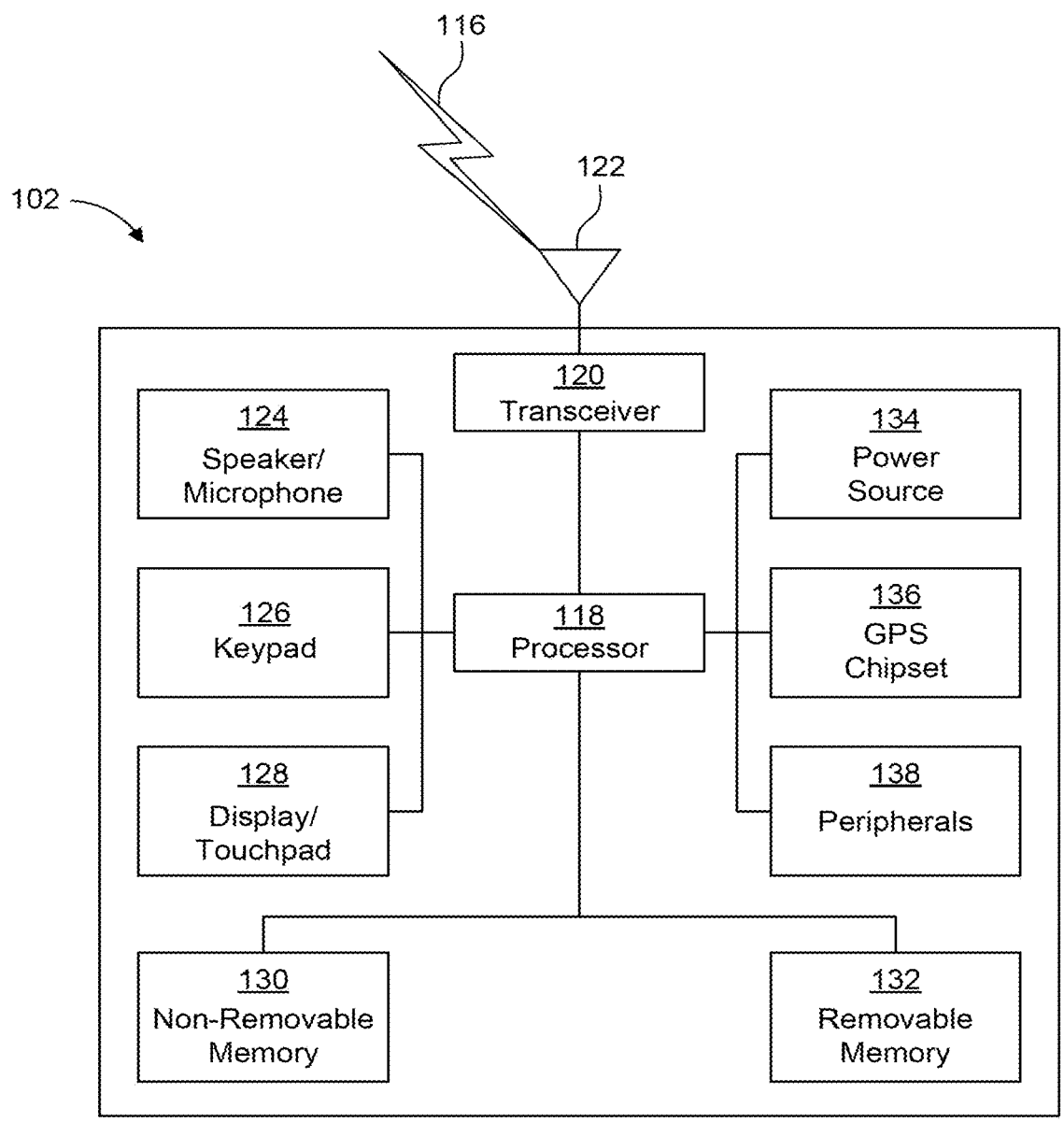
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
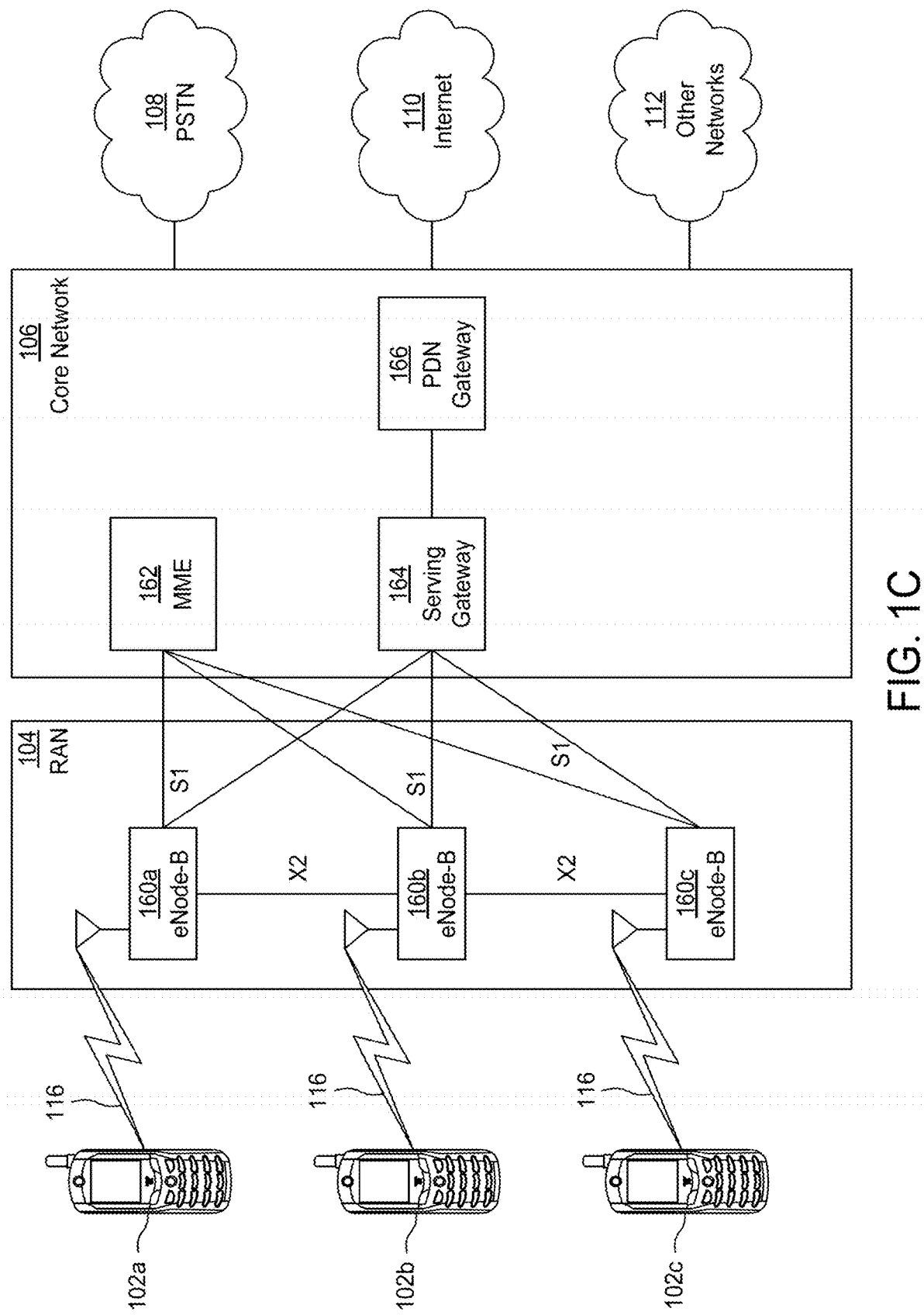
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
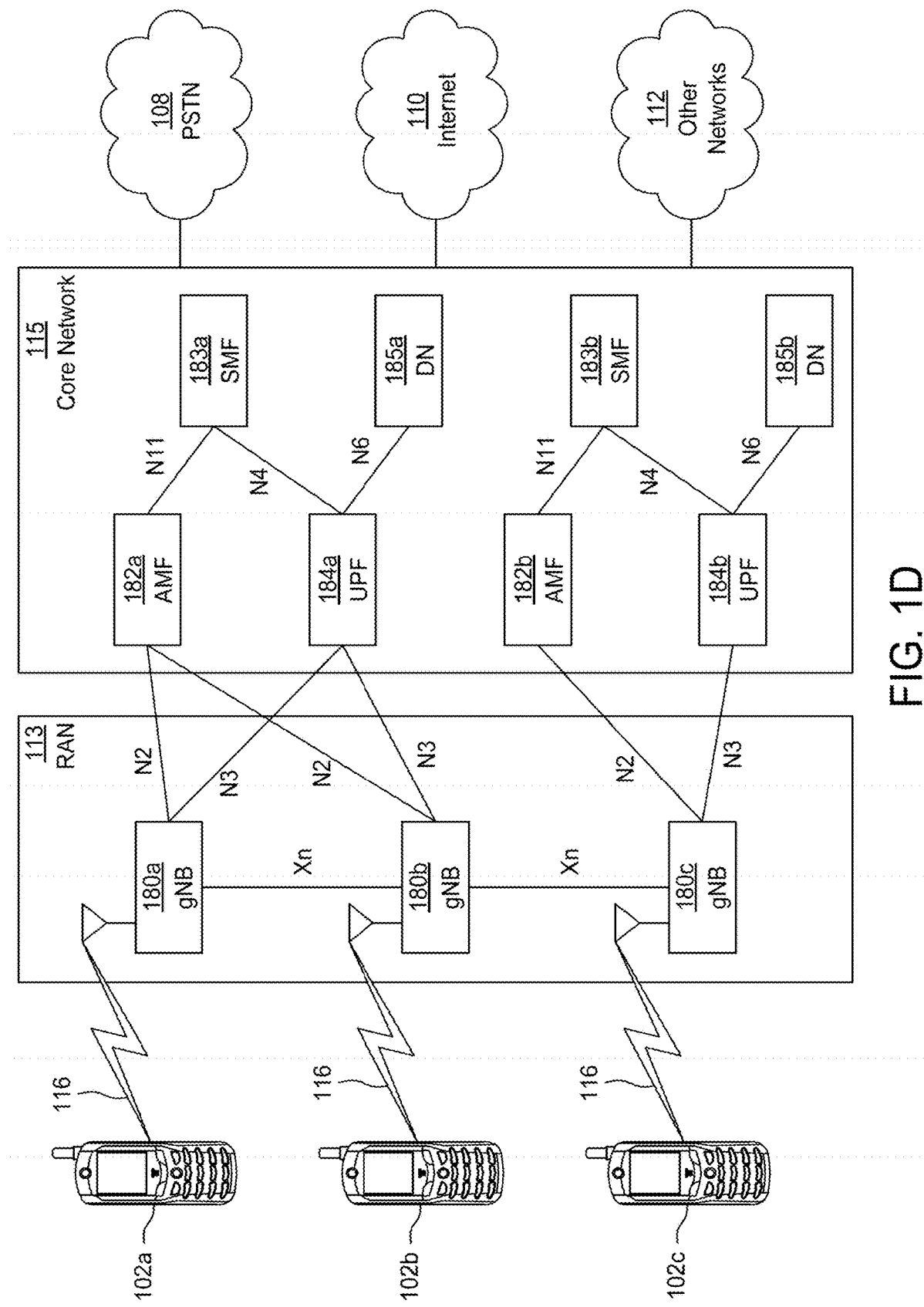
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

In the case of vehicular communications (V2X), there may be a variety of modes of operation, such as, for example, (e.g., LTE) release 14 (R14) modes 3 and 4, and release 16 (R16) mode 2. In the case of mode 2 operation, a R16 V2X WTRU performs resource (re) selection based on sensing, for example, without any central scheduling and coordination between WTRUs. In such a case, a sensing mechanism can result in (e.g., potential) collision, for example, due to a RSRP threshold increase when available resources are limited (e.g., particularly in a congested scenario). Further, in such a case, when (e.g., such) a collision occurs with respect to a semi-persistent resource reservation, the collision can become persistent and cause consecutive packet loss. As a result, R16 NR sidelink (SL) does not (e.g., cannot) ensure high reliability and low latency, for example, in conditions (e.g., such as a congested scenario) when the channel is busy.

Release 17 (R17) supports ultra reliable and low latency communications (URLLC) type SL use cases in (e.g., advanced) operation scenarios. In view of R16 providing limited support for certain transmissions (e.g., as discussed above), inter-WTRU coordination in mode 2 operation is being considered, for example, for R17. That is, for R17, inter-UE coordination is considered for improving the reliability and latency of the SL transmission. One form of such coordination is a WTRU providing assistance information to another WTRU. The assistance information can be a set of resources determined by a WTRU. For example, inter-WTRU coordination may include a first WTRU determining a set of resources and sending them to a second WTRU in mode 2, so that the second WTRU can take this into account in the resource selection for its own transmission.

However, in the case of mode 2, (e.g., conventionally, in related art, in R17, etc.) there is a lack of (e.g., no) coordination between WTRUs, and, for example, one WTRU will not know whether or when another WTRU has traffic for transmission, and, further, one WTRU will not know what types of resources another WTRU will use. Such lack of coordination may result in an excessive number of required transmissions. Thus, there is a need to enable the inter-WTRU coordination features while avoiding excessive number of required transmissions. In view of at least the above discussed problems (e.g., lack of coordination between WTRUs), there is a need to provide solutions (e.g., address, resolve, etc.) any of the following problems/questions: (1) which WTRU(s) provides assistance information?; (2) which WTRU(s) requests and/or receives assistant information?; (3) what are triggering conditions of such coordination?; (4) how do WTRU(s) obtain assistance information, for example, that is useful for resource selection of another WTRU(s)?; (5) what does the assistance information include?; (6) how is the assistance information transmitted?; and (7) how will another WTRU(s) use assistance information in its resource selection?

According to embodiments, a WTRU may transmit assistance information (e.g., may perform an assistance transmission), for example, to other WTRUs, or any other similar and/or suitable network node. According to embodiments, a WTRU may perform an assistance transmission, for example, to assist SL resource selection for transmissions by other WTRUs. According to embodiments, an assistance transmission may carry (e.g., include, assistance) information including a set of SL resources. According to embodiments, a WTRU may be an assistance WTRU (e.g., an assisting WTRU). That is, as discussed and/or referred to herein, a WTRU may be referred to as an assisting WTRU, for example, in a case of performing an assistance transmission. According to embodiments, a WTRU(s) may any of trigger or receive an assistance transmission. According to embodiments, a WTRU(s) triggering and/or receiving an assistance transmission may be referred to as an assisted WTRU. According to embodiments, herein, an assisting WTRU and an assisted WTRU may be referred to as such with respect to a (e.g., specific) assistance information transmission.

WTRU Determination of Triggering Assistance Transmission

According to embodiments, a WTRU may determine any of to perform an assistance transmission and become an assisting WTRU. According to embodiments, a WTRU may determine to perform an assistance transmission and/or become an assisting WTRU according to (e.g., based on) any number of conditions (e.g., triggers). According to embodiments, such triggers and/or conditions (e.g., used to determine any of performing an assistance transmission and/or becoming an assisting WTRU) may include any of:

(1) a WTRU receives an explicit request for assistance transmission, for example, from an assisted WTRU; (2) a WTRU receives a semi-persistent resource reservation by an assisted WTRU; (3) a WTRU receives a CSI request from an assisted WTRU; (4) a WTRU detects (e.g., a number of) collisions applicable to a semi-persistent resource reservation, for example, by/with an assisted WTRU; (5) a WTRU fails to decode a number of PSSCHs from an assisted WTRU, for example, and sends corresponding HARQ NACK transmissions; (6) a WTRU fails to decode a number of PSSCHs corresponding to a resource reservation from an assisted WTRU; (7) a WTRU is located in a range below (e.g., extending beyond) a (pre) configured (as referred to herein the terms configured, preconfigured, and (pre) configured are used interchangeably) threshold from an assisted WTRU; (8) a WTRU measures (e.g., detects, determines, etc.) a congestion metric (e.g., a channel busy ratio (CBR)) that is higher than a (pre) configured threshold; (9) a WTRU receives a configuration for assistant transmission in (e.g., during) a SL link establishment (e.g., procedure) signaling applicable to an assisted WTRU; and (10) a WTRU is a (e.g., (pre) configured, certain, etc.) type (e.g., a vehicle WTRU, a pedestrian user, vulnerable road user (VRU), a first responder user, etc.). According to embodiments, a WTRU may trigger (e.g., may determine to perform, execute, send, etc.) an assistance transmission, for example, in a case where data associated with an assisted WTRU is available (e.g., for transmission). According to embodiments, a WTRU may be (e.g., pre-) configured to perform periodic assistance transmissions, for example, for (e.g., and/or associated with) any of V2X applications, data groups, WTRU groups, application groups, etc.

Figure 2:
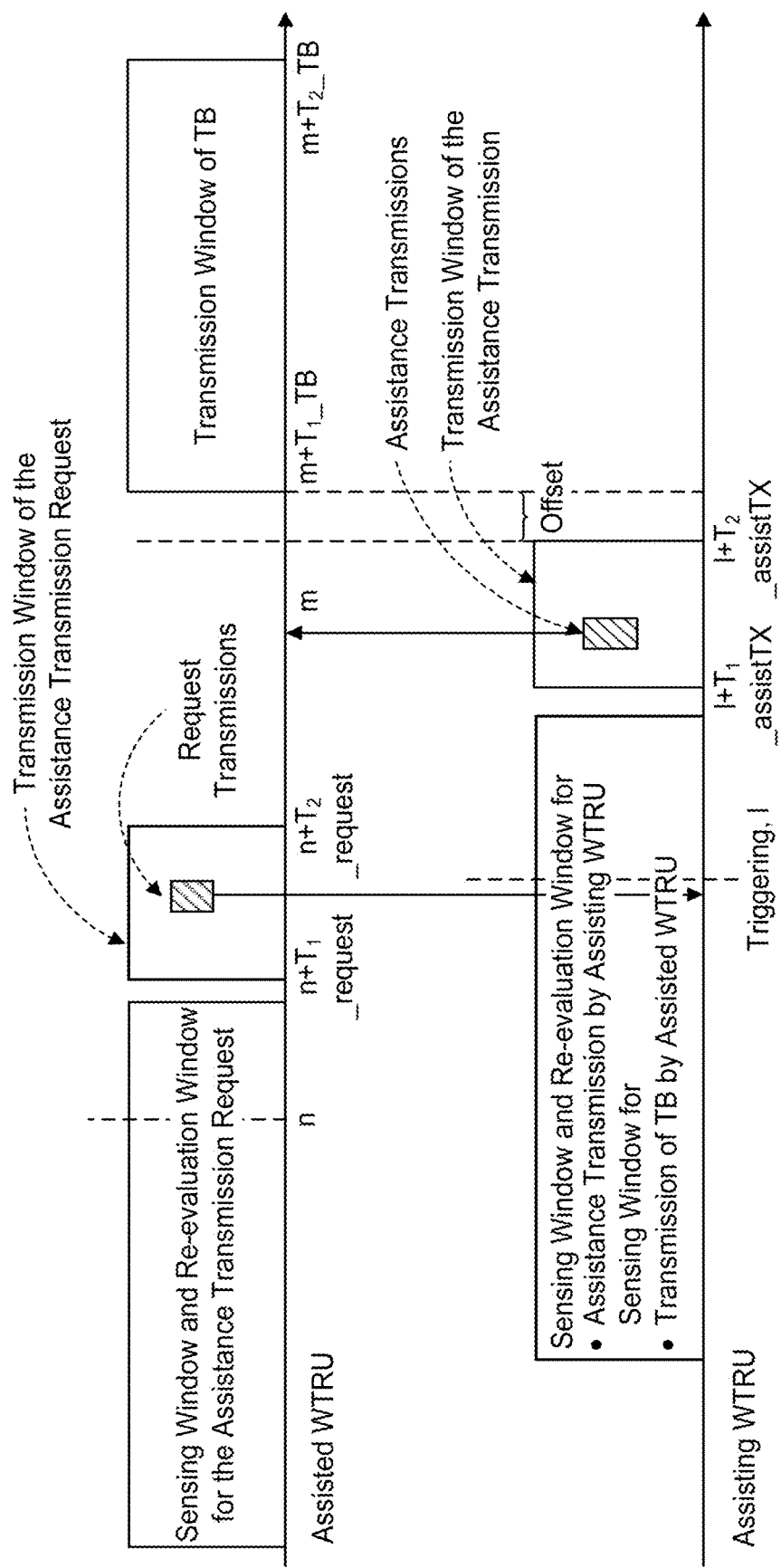
FIG. 2 is a diagram illustrating assistance information transmission triggered by an explicit request, according to embodiments.

FIG. 2 is a diagram illustrating assistance information transmission triggered by an explicit request, according to embodiments.

According to embodiments, transmission of assistance information (e.g., a WTRU assistance transmission) may be triggered by a (e.g., explicit, signaled, determined, etc.) request. According to embodiments, transmission of (e.g., such, explicit, signaled, determined, etc.) a request for an assistance transmission (e.g., an assistance transmission request) may be performed (e.g., triggered, determined, etc.), for example, according to (e.g., certain) conditions. According to embodiments, a WTRU may any of determine to transmit an explicit assistance transmission request and become an assisted WTRU, for example, in a case where (e.g., upon, when, etc.) a resource (re) selection of a transmission block (TB) is triggered by higher layers.

According to embodiments, a WTRU may any of determine to transmit an explicit assistance transmission request and become an assisted WTRU, (e.g., in addition and/or alternative to the case of a resource (re) selection of a TB being triggered by higher layers), according to (e.g., based on, satisfying, etc.) any of the following conditions (e.g., triggers): (1) a (e.g., remaining) packet delay budget exceeds a (pre) configured threshold (e.g., the remaining packet delay budget allows for round-trip propagation and WTRU processing time associated with (e.g., incurred by) the assistance transmission request and assistance transmission); (2) a reliability exceeds a (pre) configured threshold (e.g., an assistance transmission is triggered by transmission of a TB of high reliability, such as a BLER at/of 1E-5); (3) a priority exceeds a (pre) configured threshold (e.g., an inter-WTRU assistance procedure may be triggered by transmission of a TB of high priority; (4) a size of a transport packet exceeds a (pre) configured threshold (e.g., an assistance transmission may be triggered by transmission of large TB requiring a large number of sub-channels); and (5) a distance to a WTRU to which the assistance transmission request is transmitted (e.g., intended) is below a (pre) configured threshold.

According to embodiments, content of an assistance transmission request may indicate a variety of information. According to embodiments, an assisted WTRU may include, for example, in an assistance transmission request, any of the following (e.g., resource (re) selection) information: (1) a resource pool, for example, from which PSSCH resources are to be reported; (2) a L1 priority of a TB, for example, used for transmission by an assisted WTRU; (3) a remaining packet delay budget (PDB) (i.e., in slots), for example, of a TB used for transmission by the assisted WTRU; (4) a T1_TB, for example, a start of a transmission window in which the TB may be transmitted; (5) a T2_TB, for example, an end of a transmission window; (6) a number of sub-channels, for example, to be used for a PSSCH transmission of a TB; and (7) a number of resources needed (e.g., required) in a resource set, such as, for example, a ratio of (i) a number of resources requested in a resource set and (ii) a total number of candidate resources in a transmissions window.

According to embodiments, a (e.g., assisted) WTRU may determine a (e.g., remaining) PDB, for example, included in an assistance transmission request, according to (e.g., based on) any of a remaining PDB of a TB used for transmission; and a time resource reserved for the assistance transmission request. According to embodiments, a WTRU may compute a remaining PDB included in the assistance transmission request as shown in Formula [1]:

$$PDB_{signaled\ in\ request} = PDB_{TB} - (m-n) \qquad \text{[Equation 1]}.$$

According to embodiments, for example, a WTRU may compute a remaining PDB using Formula [1] in a case where a WTRU receives a resource selection triggering in a slot n that is associated with a TB and the WTRU determines to send an assistance transmission request in slot m. According to embodiments, (e.g., in another case), an assisted WTRU may determine a T2_TB based on an (pre) configured T2_min. For example, according to embodiments, in a case where T2_min<=T2_TB<=$PDB_{TB}$, an assisted WTRU may select T2_TB, for example, according to (e.g., a designed, selected, etc.) WTRU implementation. Further, according to embodiments, in a case where T2_min>$PDB_{TB}$, T2_DB may be equal to $PDB_{TB}$.

According to embodiments, an assisted WTRU may determine a T1_TB according to (e.g., based on) a QoS requirement of a TB. That is, according to embodiments, an assisted WTRU may determine an early T1_TB for a large transmission window, for example, to allow more resources for resource selection for a TB having any of a high reliability and/or a priority requirement. According to embodiments, any of a T1_TB and a T2_TB may be any of an absolute frame, sub-frame, and slot number. According to embodiments, any of a T1_TB and a T2_TB may be an offset (i.e., in a number of slots) relative to a timing (slot) of the assistance transmission request.

According to embodiments, an assistance transmission request may be transmitted using any of a variety of resources, signaling, messaging, channels, etc. According to embodiments, an assistance transmission request may be transmitted using (e.g., carried in) PHY signaling, for example, using a PSCCH. According to embodiments, an assistance transmission request may be transmitted using (e.g., carried in) a stand-alone PSCCH. According to embodiments, an assistance transmission request may be transmitted using (e.g., carried in) any of a MAC CE or RRC signaling, for example, using PSSCH transmission.

According to embodiments, an assisted WTRU may transmit an assistance transmission request according to any of a plurality of configurations. For example, according to embodiments, an assisted WTRU may transmit an assistance transmission request according to a configuration having a PSSCH/PSCCH using one sub-channel, for example, in case where an assisted WTRU transmits a PSSCH that (e.g., may) only contains an assistance transmission request. As another example, according to embodiments, an assisted WTRU may transmit an assistance transmission request according to a configuration having a PSSCH/PSCCH using multiple sub-channels, for example in a case where an assisted WTRU transmits a PSSCH including both an assistance transmission request and a data TB.

According to embodiments, an assisted WTRU may perform sensing, for example, for resource selection for an assistance transmission request. According to embodiments, a WTRU may apply any of a variety of sensing patterns, such as, for example, as discussed below. According to embodiments, a sensing parameter may be a resource pool, for example, from which resources are to be reported. That is, according to embodiments, an assisted WTRU may select resources from a resource pool dedicated to/for assistance transmission requests. According to embodiments, a sensing parameter may be an L1 priority. That is, according to embodiments, an L1 priority of an assistance transmission request may be (pre) configured, for example, such that the L1 priority is set at a highest/lowest priority. According to embodiments, an L1 priority of an assistance transmission request may be (e.g., set as) the same as that of a TB carried in the same transmission. According to embodiments, a sensing parameter may be a remaining PDB. That is, according to embodiments, a remaining PDB of an assistance transmission request may be (pre) configured. For example, any of a fixed and small value may be (pre) configured. According to embodiments, a remaining PDB of an assistance transmission request may be (e.g., set as) the same as that of the TB carried in the same transmission. According to embodiments, a sensing parameter may be a number of sub-channels, for example, to be used for the assistance transmission request.

According to embodiments, an assisted WTRU may determine any of a T1_request and a T2_request for the assistance transmission request. According to embodiments, a T1_request may be determined according to (e.g., based on) WTRU processing. According to embodiments, a T2_request may be determined according to (e.g., based on) (pre) configuration. For example, according to embodiments, a fixed T2 request may be (pre) configured for an assistance transmission request. According to embodiments, a T2_request may be determined according to (e.g., based on) a remaining PDB of a TB. That is, according to embodiments, an assisted WTRU may select a T2_request to ensure that any of the following steps may (e.g., must) be completed within a remaining PDB, including: sending/transmitting the assistance transmission request; receiving the assistance transmission; processing the assistance information and selecting resources for the transmissions of the TB; and transmitting/sending the TB.

According to embodiments, an assistance request transmission may be (e.g., sent, transmitted, etc., by a WTRU via, using, included in, etc.) a new (e.g., different than those discussed hereinabove) SL physical signal and/or physical channel. That is, according to embodiments, a WTRU may send an assistance request (e.g., transmission) in a new SL PHY signal and/or PHY channel. According to embodiments, a WTRU may be configured (e.g., preconfigured) with a resource allocation, for example, (e.g., dedicated, only, etc.) for any of an assistance request and an assistance information transmission. According to embodiments, a resource allocation may be any of: (1) a resource pool, and (2) a set of time and frequency resources, for example, allocated within a resource pool.

According to embodiments, such resources may be configured (e.g., preconfigured) for any of an assistance request transmission and an assistance information transmission (e.g., as discussed hereinabove). According to embodiments, there may be a case where such resources may not be used by/for other SL transmissions (e.g. V2X data transmissions). According to embodiments, such (e.g., set of) time and frequency resources may include (e.g., be, consist of, comprise, etc.) any of: a set of SL slots, a set of SL symbols, a set of sub-channels, a set of PRBs, and a set of sub-carriers. According to embodiments, such (e.g., set of) time and frequency resources may be configured (e.g., preconfigured) in/for a resource pool for SL data transmission.

According to embodiments, a WTRU may determine resources for an assistance request transmission. According to embodiments, a WTRU may determine (e.g., select, be preconfigured for, etc.) resources, such as time and frequency resources, of any of a PHY assistance request channel and a ZC sequence index according to any of: (1) a Source ID and/or Destination ID of the SL link the assistance request is intended for (2) a Link ID of the SL link for which the assistance request is intended; (3) a total number of time and frequency resources configured (e.g., preconfigured) for assistance request transmission; (4) a total number of ZC sequences configured (e.g., preconfigured) for an assistance request transmission; and (5) an index/number of the slot of the request transmission. According to embodiments, there may be a case where a WTRU may trigger an assistance request transmission according to (e.g., based on) triggering conditions (e.g., discussed hereinabove). According to embodiments, in such a case, a WTRU may select an SL slot that is earliest (e.g., immediately) after the triggering, for example, such as an SL slot in which resources for assistance request transmission are preconfigured. According to embodiments, available resources (e.g., resource that are available) for the assistance request transmission may be indexed, for example, according to (e.g., based on) a total number of configured (e.g., preconfigured) ZC sequences and frequency resources (e.g. PRBs). According to embodiments, each resource may be any of a ZC sequence and a frequency resource (e.g. PRB).

According to embodiments, an index of a request transmission resource may increase following a configured (e.g., preconfigured) ZC sequence set within a PRB, and may further (e.g., subsequently) increase for (e.g., per, for each, etc., subsequent) configured (e.g., preconfigured) PRBs. According to embodiments, for example, in a case having six configured (e.g., preconfigured) ZC sequences, resources for the assistance request transmission may be indexed from 0 to 5 within the first configured (e.g., preconfigured) PRBs and from 6 to 11 within the second PRB. That is, for example, an index may increase by 6 in each PRB until the last configured (e.g., preconfigured) PRB. According to embodiments, such indexing may provide an index of each available resource, for example, for a WTRU to select for the assistance request transmission. According to embodiments, a WTRU may determine any number of such resources according to (e.g., based on) any of: a WTRU ID and/or a Link ID, an index of the SL slot, and the total number of the resources. For example, a WTRU may select an index according to a modular function using a source ID (e.g., decimal format) and a total number of the indexed resource(s).

Figure 3:
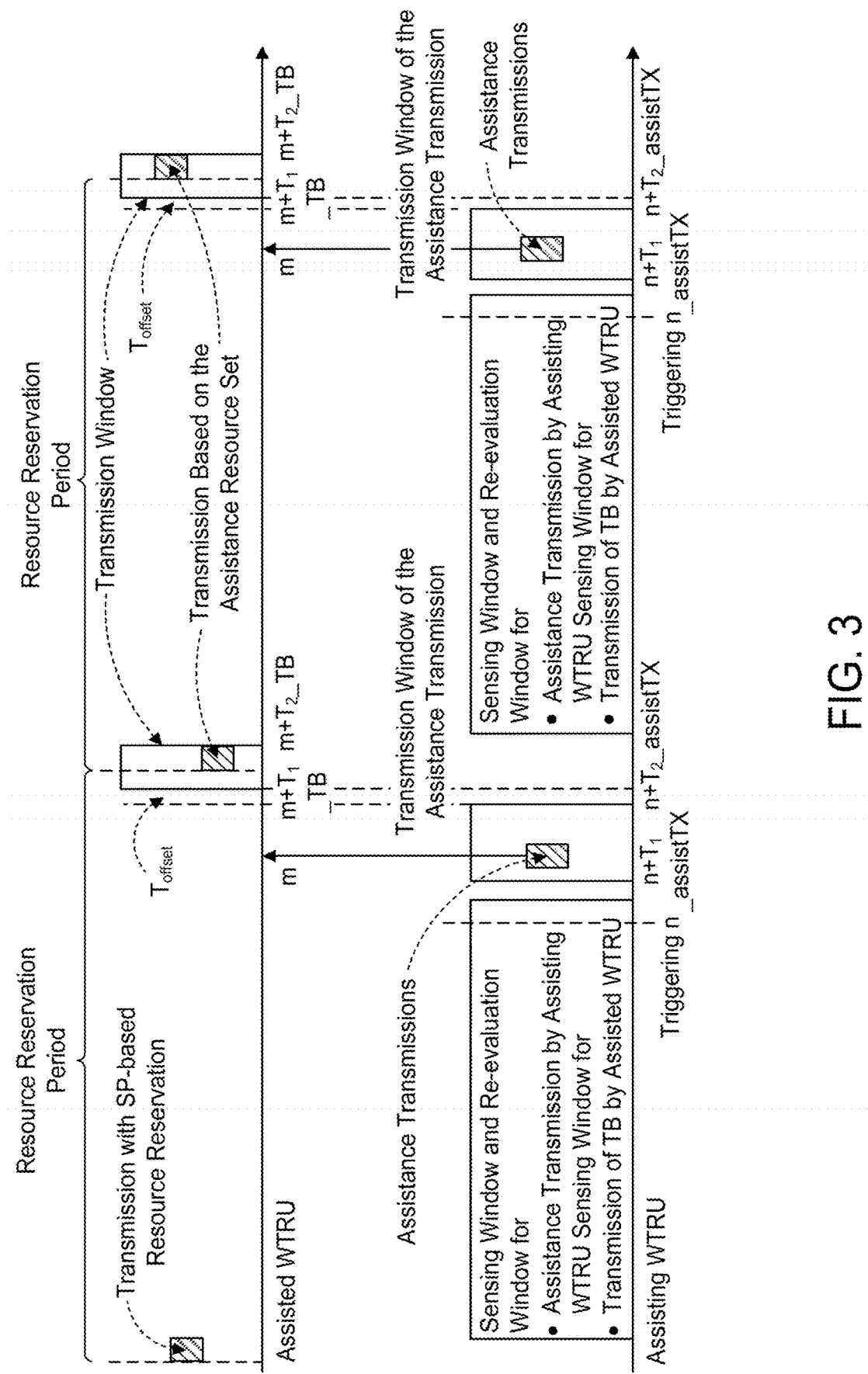
FIG. 3 is a diagram illustrating assistance information transmission triggered by a semi-persistent (SP) based resource reservation, according to embodiments.

FIG. 3 is a diagram illustrating assistance information transmission triggered by a semi-persistent (SP) based resource reservation, according to embodiments.

According to embodiments, a WTRU may perform an assistance transmission triggered by a received SP resource reservation. According to embodiments, a WTRU may any of determine to perform assistance transmission and become an assisting WTRU, for example, in a case where the WTRU receives a data transmission with a SP resource reservation. According to embodiments, a WTRU may determine that data (e.g., the received data transmission) may be intended for itself, and may continue receiving the data, for example, according to (e.g., based on) an identifier (ID), such as any of a destination ID, a source ID, and a group member ID. According to embodiments, a destination ID may be carried in a $2^{nd}$ SCI and may indicate a broadcast link to which the WTRU may be subscribed. According to embodiments, any of a source ID and a destination ID may be carried in a $2^{nd}$ SCI and may indicate a unicast link that the WTRU may have established. According to embodiments, in a case of a group member ID, a destination ID carried in a $2^{nd}$ SCI may indicate a groupcast link to which the WTRU may be subscribed.

According to embodiments, an assisting WTRU may trigger an assistance transmission for any (e.g., each) reserved period. According to embodiments, an assisting WTRU may not trigger an assistance transmission later than a slot n. According to embodiments, an assisting WTRU may not trigger an assistance transmission later than a slot n based on any of: a beginning of a transmission window associated with a reserved transmission TxWindow_start; a T2 of the assistance transmission; and a (pre) configured offset between a beginning of a transmission window and a T2 of the assistance transmission Toffset. For example, there may be a case where a slot n may not be the slot corresponding to the timing of TxWindow_start–Toffset–T2. According to embodiments, a result (e.g., a purpose) of such a case may be to allow sufficient time for the assisted WTRU to receive the assistance transmission and process the received resource set to select the resources for the reserved transmission.

According to embodiments, a WTRU assistance transmission may be triggered by received CSI request transmission. That is, according to embodiments, a WTRU may determine to perform assistance transmission and become an assisting WTRU, for example, in a case where the WTRU receives a CSI request transmission. According to embodiments, a WTRU may provide (e.g., transmit) the assistance information and CSI reporting in one transmission.

According to embodiments, a WTRU assistance transmission may be triggered by detection of collisions for a received SP resource reservation. According to embodiments, a WTRU may determine to perform assistance transmission and become an assisting WTRU, for example, in case where the WTRU detects a set of collisions, for example, for a received SP resource reservation. According to embodiments, a WTRU may detect a collision specific to a resource reservation already received from another WTRU, which may be referred to as a standing reservation. That is, according to embodiments, a WTRU may detect a collision specific to a received resource reservation in a case where a WTRU identifies overlapping resource reservations from different WTRU(s) with higher L1 priority. According to embodiments, a WTRU may detect a collision specific to a resource reservation in a case where a WTRU measures an RSRP associated with any resource reservations from other WTRUs larger than a corresponding RSRP threshold. According to embodiments, a WTRU may determine a corresponding RSRP threshold according to any of: (1) RSRP(s) values in transmissions received in reserved resources in (e.g., previous) reservation periods, such as any of a RSRP value of a most recent received transmission, an RSRP value averaging over a number of recent received transmissions, and a maximum RSRP value over a number of recent receive transmissions; (2) a (pre) configured offset of X dB (e.g. 0 dB or 3 dB); (3) an L1 priority of a standing reservation (P1); (4) and an L1 priority of an overlapping reservation (P2).

According to embodiments, a corresponding RSRP threshold may be a sum of an RSRP value and an offset. According to embodiments, a corresponding RSRP threshold may be a weighted RSRP value, for example, based on the RSRP value. According to embodiments, a weighting coefficient may be based on L1 priorities, for example, of both overlapping resource reservations (e.g. using a (pre) configured function (P1, P2)).

According to embodiments, a WTRU may determine to perform assistance transmission and become an assisting WTRU in a case where detected collisions exceed a (pre) configured threshold (e.g. 1, 5, 10, etc.). According to embodiments, a WTRU may maintain a counter for consecutive collisions, for example, within a (pre) configured time period and/or up to a threshold. According to embodiments, consecutive collisions may indicate that collision events may be occurring in consecutive periods of the standing resource reservation. According to embodiments, in a case of detecting collisions, a result (e.g., a purpose) may be to identify persistent collision events, and (e.g., subsequently) send an assistance resource set to initiate a resource re-selection, for example, to avoid future collisions.

According to embodiments, there may be a case where a WTRU may decode any of a first state SCI and a second stage SCI, of a PSSCH transmission, for example, at a transmission instance(s) of a received SP-based resource reservation(s). According to embodiments, in such a case, a WTRU may determine a collision according to (e.g., based on) any of: (1) resources reserved in the first stage SCI; (2) a WTRU type indication in the first stage SCI; and (3) a source ID and/or a destination (e.g., destination ID) in the second stage SCI. According to embodiments, a WTRU may determine a collision when any (e.g., number) of decoded information listed above are not equal to corresponding parameters of the received SP-based reservation of the resource.

Figure 4:
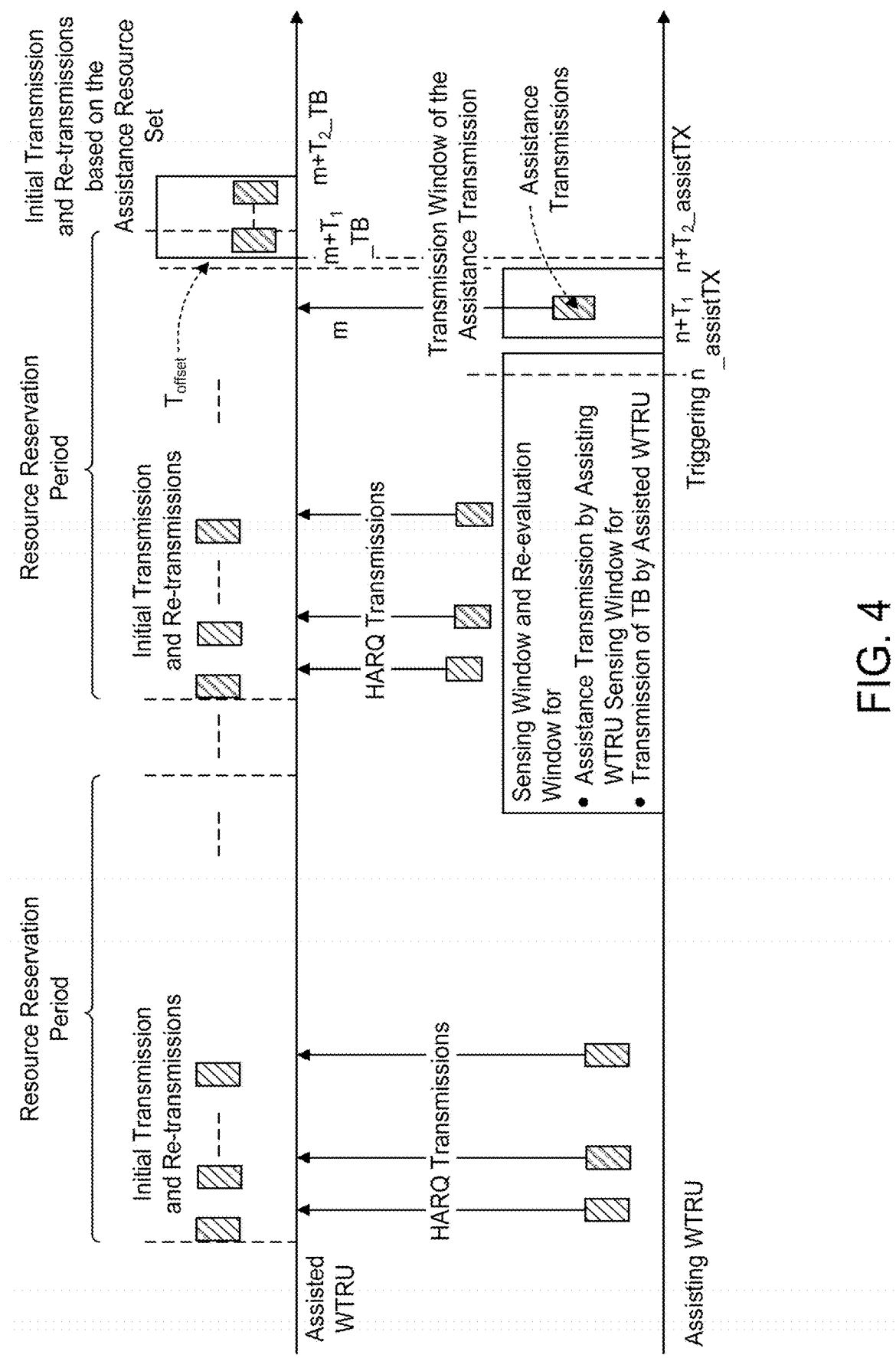
FIG. 4 is a diagram illustrating an assistance transmission triggered by any of HARQ ACK/NACK transmissions and HARQ re-transmissions, according to embodiments.

FIG. 4 is a diagram illustrating an assistance transmission triggered by any of HARQ ACK/NACK transmissions and HARQ re-transmissions, according to embodiments.

According to embodiments, a WTRU assistance transmission may be triggered by HARQ NACK transmissions, for example, referring to FIG. 4. According to embodiments, a WTRU may determine to perform an assistance transmission and become an assisting WTRUE in a case where a number of HARQ NACK transmissions corresponding to a resource reservation exceeds a (pre) configured threshold. According to embodiments, a WTRU may determine to perform assistance transmission and become an assisting WTRU in a case where a number of events of HARQ re-transmissions reaches a (pre) configured maximum number and/or exceeds a (pre) configured threshold. According to embodiments, a WTRU may select a threshold, for example, from among any number of (pre) configured thresholds.

According to embodiments, a WTRU may select a threshold according to (e.g., based on) a fixed value (e.g. a (pre) configured value specific to a resource pool). According to embodiments, the value may be equal to the (pre) configured maximum number of HARQ re-transmissions per resource pool. According to embodiments, a WTRU may select a threshold according to (e.g., based on) a QoS (e.g. a low threshold corresponding to high reliability and/or low latency). According to embodiments, a WTRU may select a threshold according to (e.g., based on) a CBR (e.g. a low threshold when CBR is high). According to embodiments, a WTRU may select a threshold according to (e.g., based on) a RSRP of the received PSCCH transmission (e.g. a low threshold when the PSCCH RSRP is below a (pre) configured threshold). According to embodiments, a WTRU may select a threshold according to (e.g., based on) CSI of a received PSSCH transmission (e.g., a low threshold in a case where a CQI applicable to sub-channel(s) of the received PSSCH transmission is below a (pre) configured threshold). According to embodiments, a WTRU may select a threshold according to (e.g., based on) a WTRU speed (e.g., mobility state) (e.g. a low threshold in a case where a WTRU speed is high and a channel varies quickly).

According to embodiments, a dynamic threshold selection may allow a WTRU to perform assistance transmission more often, for example, in a case where a channel condition is degraded. According to embodiments, a WTRU may count HARQ NACK transmissions for all initial and re-transmissions. According to embodiments, in such a case, for each reservation interval, there may be multiple HARQ NACK transmissions. According to embodiments, a WTRU may count one HARQ NACK for each reservation period (e.g., the NACK corresponding to the final HARQ re-transmissions). According to embodiments, in a case where a WTRU determines that a number of events of HARQ re-transmissions has reached or exceeded a (pre) configured maximum number, the WTRU may include the events occurring over consecutive periods of a resource reservation.

According to embodiments, a WTRU assistance transmission may be triggered according to (e.g., based on) failure of receiving any number of TBs. According to embodiments, a WTRU may determine to perform an assistance transmission and become an assisting WTRU in a case where a number of TBs that the WTRU fails to receive exceeds a (pre) configured threshold. According to embodiments, for example, in a case where HARQ is disabled, a WTRU may make a determination according to a number of TBs that the WTRU fails to receive over consecutive periods of a resource reservation, for example, compared to a (e.g., the (pre) configured) threshold. According to embodiments, a WTRU may select a threshold according to any of: (1) a fixed value (e.g. a (pre) configured value specific to a resource pool); (2) a QoS (e.g. a low threshold corresponding to high reliability and/or low latency); (3) a CBR (e.g. a low threshold in a case where CBR is high); (4) a RSRP of a received PSCCH transmission (e.g. a low threshold in a case where the PSCCH RSRP is below a (pre) configured threshold); (5) CSI of a received PSSCH transmission (e.g. a low threshold when the CQI applicable to the sub-channel(s) of the received PSSCH transmission is below a (pre) configured threshold); and (6) a WTRU speed (mobility, mobility state, etc.) (e.g. a low threshold when a WTRU speed is high and the channel varies quickly).

According to embodiments, a WTRU assistance transmission may be triggered according to (e.g., by) a range (e.g., a distance, a value, a location, etc.). According to embodiments, a WTRU may determine to perform an assistance transmission and become an assisting WTRU in a case where a WTRU is located at and/or in a (pre) configured range, for example, between itself and an assisted WTRU. According to embodiments, a WTRU may determine to perform an assistance transmission and become an assisting WTRU in a case where a WTRU receives a semi-persistent resource reservation from an assisted WTRU. According to embodiments, a range may be determined according to any of a minimum communication range requirement and a (pre) configured threshold. For example, a WTRU may determine to perform assistance transmission and become an assisting WTRU in a case where the WTRU moves within a range of MCR-X meters, where X may be a (pre) configured threshold.

According to embodiments, a WTRU assistance transmission may be triggered by a CBR. According to embodiments, a WTRU may determine to perform an assistance transmission and become an assisting WTRU in a case where any of: (1) a WTRU measures a CBR higher than a (pre) configured threshold; and (2) the WTRU has received a semi-persistent resource reservation from an assisted WTRU.

According to embodiments, a WTRU assistance transmission may be performed (e.g., triggered) according to (e.g., by, based on, etc.) a configuration. According to embodiments, a WTRU may determine to perform an assistance transmission and become an assisting WTRU in a case where the WTRU receives a configuration for assistance transmission. According to embodiments, for example, a WTRU may receive a configuration for assistance transmission during link establishment of a unicast link. According to embodiments, the assistance transmission configuration may include information (e.g., used, indicating, etc.) for determining occasions for/of the assistance transmission (e.g. periodicity of the transmission and/or the traffic/transmission pattern of the associated service).

According to embodiments, a WTRU assistance transmission may be performed (e.g., triggered) according to a WTRU type. According to embodiments, a WTRU may determine to perform an assistance transmission and become an assisting WTRU in a case where any of: (1) a WTRU is of a (e.g., specific, certain, (pre) configured) type of WTRU (e.g. pedestrian or VRU type); and (2) a WTRU receives a SP resource reservation from an assisted WTRU. According to embodiments, a WTRU may have a (pre) configuration for assistance transmission.

According to embodiments, a WTRU may determine to perform an assistance transmission and become an assisting WTRU in a case where any/all of: (1) a WTRU is of a (pre) configured type (e.g., vehicular WTRU, that is, a V2X device installed in a vehicle); (2) a WTRU may be configured by a higher layer to perform periodic assistance transmission(s); and (3) a measured CBR exceeds a (pre) configured threshold.

According to embodiments, a WTRU assistance transmission may be performed according to (e.g., triggered by, based on, etc.) an indication of a change in resource reservation. According to embodiments, a WTRU may determine to perform an assistance transmission and become an assisting WTRU in a case where the WTRU receives an (e.g., implicit, explicit, etc.) indication of a change in resource reservation of a (e.g., one, any number of, etc.) SL process(es) from an assisted WTRU. According to embodiments, an assisted WTRU may (e.g., need to) perform resource (re-)selection for a (e.g., one, any number of, etc.) SL process(es) according to any of the following: (1) a resource (re-)selection counter of the sidelink process reaches zero; and (2) a traffic pattern of a WTRU is changed, for example, including a change of any of: a periodicity, an offset, a TB size, and a packet size. For example, there may be a case of an assisted WTRU having one set of resources semi-persistently reserved for one sidelink process. According to embodiments, in such a case, an assisting WTRU may trigger assistance transmission when (e.g., any number of) transmissions in the reserved resource indicate no further semi-persistence reservation for the set of resources. According to embodiments, such an indication (e.g., of information included in transmission in the reserved resource) may be conveyed using any of SCI, MAC CE, or RRC.

According to embodiments, a WTRU assistance transmission may performed (e.g., is triggered) in a case where data associated with an assisted WTRU is available. According to embodiments, an assisting WTRU may trigger an assistance transmission for one assisted WTRU, for example, (e.g., only) in a case where data associated with the assisted WTRU is available. In such a case, the WTRU may not build a TB including only assistance information.

According to embodiments, a periodic assistance transmission, for example, transmitted by a WTRU, may be (pre) configured for (e.g., to be associated with) any of applications, (e.g., groups of applications, V2X applications, etc.), WTRU groups, and data groups. According to embodiments, a WTRU may be (pre) configured to perform periodic assistance transmissions. According to embodiments, periodic assistance transmissions may be any of (1) a semi-persistent broadcast transmission and (2) groupcast transmission, for example, for any of associated V2X applications, V2X data groups, V2X WTRU groups, etc. According to embodiments, a vehicular WTRU (VWTRU), may be (pre) configured by higher layers, for example, to perform (e.g., transmit, send, etc.) periodic assistance transmissions to provide (e.g., by including information indicating) available resource information. According to embodiments, periodic assistance transmissions may be transmitted (e.g., provided, sent, directed, etc.), by a VWTRU, to any number of V2X WTRUs in proximity (e.g., to the VWTRU). According to embodiments, a (e.g., V2X) WTRU in proximity (e.g., to a VWTRU) may be and/or include any of the below discussed WTRUs; however, the present disclosure is not limited thereto, and any type of WTRU suitable for operations and features described herein may be a WTRU in proximity to a VWTRU.

According to embodiments, a WTRU in proximity may be any of a PWTRU or a VRU, transitioning from inactive/sleep state to active/awake state, for example, to initiate a SL transmission. In a case where such PWTRUs/VRUs may not perform sensing during inactive/sleep periods, such may not have information needed (e.g., used, required, etc.) for resource selection for a SL transmission during an active/awake state. According to embodiments, for example, in such a case, any of a PWTRU and a VRU may perform resource selection, for example, according to (e.g., based) on received assistance resource information, that is, for example, until sensing information becomes available.

According to embodiments, a WTRU in proximity may be any of PWTRUs and VRUs (e.g., devices) having (e.g., with) battery constraint (e.g., low available battery amount, high battery energy consumption rate, etc.). According to embodiments, any of a PWTRU and a VRU device may be (pre) configured not to perform sensing, for example, in a case where a battery level is below a (pre) configured threshold. According to embodiments, in such a case any of a PWTRU and a VRU may perform resource selection for SL transmission, for example, according to (e.g., based on) (e.g., received) assistance resource information. According to embodiments, a WTRU in proximity may be any number of groups of WTRUs (e.g., a group of V2X WTRUs) in a group transmission (pre) configured to share any of sensing information and resource selection information between group members (e.g., WTRUs). For example, according to embodiments, a (e.g., one) group member WTRU may perform sensing and resource selection and may transmit (e.g., the resulting, and/or other) assistance resource information, for example, to other member WTRUs.

According to embodiments, a WTRU may be (pre) configured with any number of periodicities for assistance transmissions, for example, according to (e.g., respective to, per, etc.) any number of resource pools. For example, according to embodiments, a periodicity of assistance transmissions may be (e.g., determined, configured, etc., to be) according to (e.g., based on, identical to, the same as, etc.) a length of a per-slot bit map, for example, (pre) configured for each SL resource pool. According to embodiments, a WTRU may be (pre) configured with a set of assistance transmission windows, for example, a set of consecutive assistance transmission windows within a resource pool. According to embodiments, an assisting WTRU may perform an assistance transmission in any (e.g., each) (pre) configured period and/or in any (e.g., each) assistance transmission window.

According to embodiments, an assisting WTRU may randomly select a timing instance, for example, for an assistance transmission within an assistance transmission period and/or window. According to embodiments, an assisting WTRU may perform an assistance transmission according to an offset, for example, such as an offset (e.g., of slots, windows, frames, time, etc.) from the beginning of an assistance transmission period and/or window. For example, an offset may be a zero slot that is at the beginning of an assistance transmission period and/or window. According to embodiments, an offset may be (pre) configured, for example, according to (e.g., based on, per, etc.) resource pool.

According to embodiments, a periodicity of the assistance transmissions may be associated with any of: V2X data groups, WTRU groups, QoS requirements associated with assistance resource information, and a CBR. According to embodiments, small periodicities may be applied, for example, in a case having low latency requirements for a V2X data transmission. According to embodiments, an assisting WTRU may decrease a periodicity of assistance transmissions (e.g., increase the number of assistance transmissions), for example, in a case where a (e.g., measured, determined, etc.) CBR is below a (pre) configured threshold. According to embodiments, in such a case, there may be an increase in (e.g., more available) assistance information for assisted WTRUs, for example, without increasing channel congestion.

According to embodiments, an assisting WTRU may indicate a periodicity of assistance transmissions. For example, according to embodiments, an assisting WTRU may transmit information indicating a periodicity of assistance transmissions in a reservation period indication bit field in a SCI of the assistance transmission. According to embodiments, an assisted WTRU may determine any of: V2X application(s), V2X data groups, and QoS requirements associated with the assistance resource set information carried in the assistance transmission, for example, based on a reservation period indication bit field. According to embodiments, in such a case, an assisted WTRU may select resources from the assistance resource set for a SL transmission of a TB, for example, for any of a V2X application, V2X data group, and QoS requirements of its SL TB, according to (e.g., based on, as indicated, etc.) a reservation period indication bit field.

Figure 5:
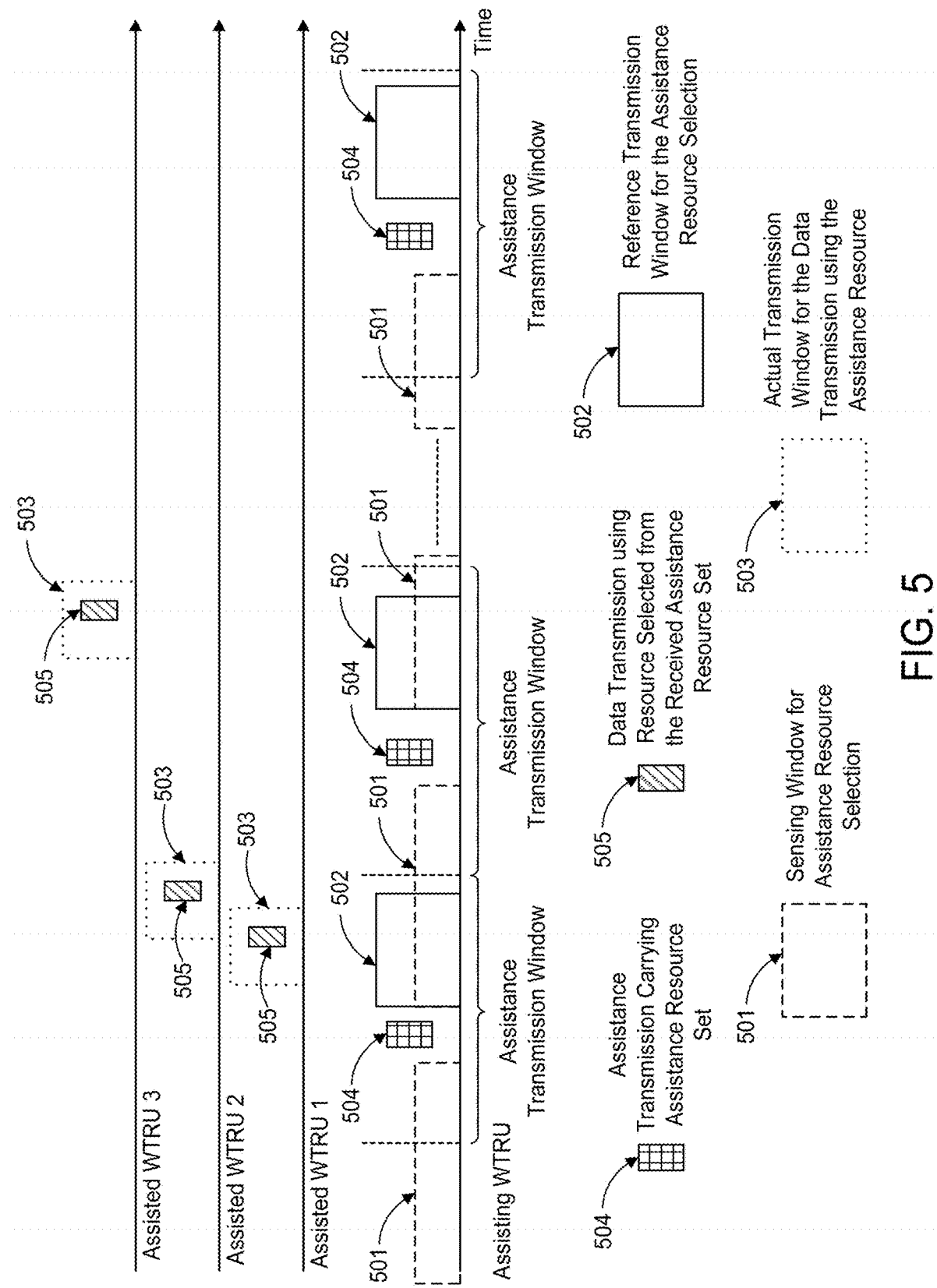
FIG. 5 is a diagram illustrating an assistance transmission providing resource set information, according to embodiments.

FIG. 5 is a diagram illustrating an assistance transmission providing resource set information, according to embodiments.

According to embodiments, for example, referring to FIG. 5, an assistance transmission (e.g., sent by a WTRU) may provide resource set information to (e.g., other) WTRUs, for example, that are within a (e.g., certain) proximity. According to embodiments, an assisting WTRU may perform sensing, for example, to select candidate resources included in an assistance resource set. According to embodiments, a candidate assistance resource in an assistance resource set may be a single-slot assistance resource over a (e.g., reference) number of sub-channels. According to embodiments, an assisting WTRU may determine any of the following sensing parameters: (1) a resource pool; (2) a sensing window 501 length; (3) a reference transmission window 502 length; (4) a reference number of sub-channels; (5) a reference RSRP threshold; and (6) a minimum number of resources for (e.g., needed for, required in, etc.) the resource set.

According to embodiments, for example, in a case of a resource pool as a sensing parameter, a resource pool of an assistance resource set may be the same as that used for an assistance transmission. According to embodiments, a resource pool for (e.g., used for, associated with, etc.) assistance resource information may be (pre) configured for any of V2X applications, data groups, WTRU groups, etc. According to embodiments, a resource pool, for example, that is used for any of V2X WTRUs during a DRX transition period and WTRUs with battery constraint, may be any of dedicated and (pre) configured for such WTRU groups (e.g., V2X WTRUs during a DRX transition period and WTRUs with battery constraint). According to embodiments, for example, in a case of a sensing window 501 length (e.g., a length of the sensing window 501 as a sensing parameter), a sensing window length may be (e.g., indicated by) any value, such as, for example, a time value (e.g. 100 ms, 1000 ms, etc.). According to embodiments, for example, in a case of a reference transmission window 502 length (e.g., a length of the reference transmission window 502 as a sensing parameter), a reference transmission window length may be (e.g., indicated by) any value, such as, for example, a time value (e.g. 10 ms, 20 ms, 100 ms, etc.). According to embodiments, such length (e.g., parameter, value, etc., of the reference transmission window) may be associated with (e.g., depend on) any of V2X data groups, WTRU groups, and QoS requirements supported by the assistance resource information. For example, a low latency V2X data group may use a small transmission window.

According to embodiments, for example, in a case of a reference number of sub-channels as a sensing parameter, the reference number of sub-channels may be a value from a (pre) configured set, for example, including 1, 2, 4, etc. According to embodiments, a WTRU may select a reference number of sub-channels, for example, according to any of a V2X data group, WTRU group, and QoS requirements of the assistance resource information. For example, a WTRU may select a small reference sub-channel number for any of V2X data groups and WTRU groups using periodic and small packet size. According to embodiments, for example, in a case of a reference RSRP threshold as a sensing parameter, such may be a measured RSRP value, for example, used to determine whether a resource may be included in the assistance resource set. According to embodiments, a reference RSRP threshold may be based on any of a measured RSRP, a L1 priority decoded in the resource, and a reference TX priority.

According to embodiments, a reference TX priority may be (pre) configured and associated with any of a V2X data group, a WTRU group, and QoS needs (e.g., requirements) of the assistance resource information. According to embodiments, for example, in a case of a sensing parameter being a minimum number of resources needed (e.g., used, required, requested etc.) in a resource set. According to embodiments, the minimum number of resources may be given as (e.g., referred to) X %, wherein X may be a ratio of: (1) a number of the resources requested in the assistance resource set and, (2) a total number of candidate resources in the reference transmissions window (e.g. 20%, 35%, 50%, etc.), for example, determined according to (based on) any of a V2X data group, a WTRU group, and QoS requirements associated with the assistance resource set information. For example, according to embodiments, a WTRU may include more candidate resources (e.g. 50% in an assistance resource set), for example, for any of high reliability V2X data transmission and/or VRUs.

According to embodiments, an assisting WTRU determine (e.g., select) a set of candidate resources selected according to (e.g., derived from) sensing results, and may include such a set, for example, in an assistance transmission 504. According to embodiments, an assisting WTRU may include any number of sensing parameters, such as any of the above discussed sensing parameters, in assistance information. According to embodiments, an assisting WTRU may indicate (e.g., send a message indicating) an index of the reference sensing configurations applied for a candidate resource set. For example, according to embodiments, a reference sensing configuration may be (pre) configured for any of assisting and assisted WTRUs. According to embodiments, an assisting WTRU may include (e.g., transmit, send, etc.) an indication in SCI, for example, to indicate the data carried in a PSSCH may be assistance information, for example, including any of an assistance resource set and related parameters.

According to embodiments, an assisted WTRU may determine reference sensing parameters according to (e.g., based on) any of a sensing configuration indication and a set of sensing parameters included in assistance transmission. According to embodiments, a reference transmission window associated with assistance resource set information may be a slot in which the assistance transmission is received. According to embodiments, a start of the reference transmission window may be (pre) configured, for example, using an offset that may be (e.g., in terms of) a number of slots from the slot in which the assistance transmission is received. According to embodiments, an assisted WTRU may compute a transmission window associated with a received assistance resource set, and may determine a subset of the received assistance resources (e.g., of the set) that may be used for a (e.g., its) SL transmission, for example, based on the WTRU's actual transmission window 503 purple window shown in FIG. 4. According to embodiments, an actual transmission window 503 may be determined according to (e.g., based on) a packet delay budget (PDB) of a TB to be transmitted.

According to embodiments, an assisting WTRU may include a priority value associated with each assistance resource in the assistance resource set information. According to embodiments, an assisted WTRU may compute a relative RSRP threshold of each assistance resource, for example, according to a received priority (e.g., respectively) associated with of each resource and priority associated with the assisted WTRU's actual SL transmission 505. According to embodiments, an assisted WTRU may determine a subset of assistance resources having (e.g., with) a RSRP value lower than a (e.g., computed) relative RSRP threshold. According to embodiments, an assisted WTRU may (e.g., randomly) select resources from among the determined assistance resource subset, for example, for an (e.g., actual) SL transmission 505. According to embodiments, an assisted WTRU may perform sensing on/for received assistance resources, for example, for resource selection for an (e.g., actual) SL transmission 505.

According to embodiments, an assisted WTRU may receive and/or apply an assistance resource set transmission, for example, for first SL transmissions in a case where the assisted WTRU does any of transitions to an active/wake state and starts performing sensing. According to embodiments, an assisted WTRU may stop receiving an assistance transmission(s), for example, in a case where sensing information is (e.g., becomes) available for resource selection, that is, for example, in a case where the assisted WTRU may have accumulated sensing data in or for a complete sensing window.

According to embodiments, a WTRU may determine to not perform an assistance transmission in a case of a trigger (e.g., triggering) condition (e.g., occurring). According to embodiments, a WTRU may determine not to perform a triggered assistance transmission in a case of any of the following: (1) a WTRU TX-RX distance is larger than a threshold configured for a resource pool for the inter-WTRU assistance; (2) a WTRU battery level is below a threshold configured for the inter-WTRU assistance; (3) a measured CBR is higher than a threshold configured for the inter-WTRU assistance, and (4) a WTRU receives such a triggered assistance transmission from another WTRU.

UE Determination of Information in and/or for an Assistance Transmission

According to embodiments, a WTRU may determine content included in assistance information (e.g., of an assistance transmission). According to embodiments, an assisting WTRU may provide (e.g., information indicating) a set of resources in an assistance transmission. According to embodiments, an assisting WTRU may include (e.g., information) indications regarding any number of triggering conditions of the assistance transmission. According to embodiments, such indications (e.g., information indicating) may be any of: a collision detection indication, a high CBR indication, a range indication, and a consecutive TB decoding failure indication. According to embodiments, in a case of X triggering conditions, a number of bits (e.g., required, used) for this indication may be $[\log_2 X]$.

According to embodiments, an assisting WTRU may send (e.g., include), in (e.g., along with) an assistance transmission, any of the following (e.g., information): (1) congestion control information, (2) resource pool indication; (3) CSI associated with assistance resources, (4) signal measurements associated with assistance resources, (5) interference measurements associated with assistance resources; (6) indication of grant free resources; and (7) speed and/or location of the assisting WTRU. According to embodiments, in a case of providing congestion control information (e.g., CBR information), a WTRU may include a CBR measurement in an assistance transmission, for example, according to (e.g., based on) any of zone ID information and a CBR value. For example, according to embodiments, a WTRU may send CBR information in a case having (e.g., of, including, etc.) any of a zone ID changes and a measured CBR value exceeds a (pre) configured threshold.

According to embodiments, in a case of a resource pool indication, a WTRU may include an index of a resource pool(s) that may (e.g., will) be used by an assisted WTRU in an assistance transmission. According to embodiments, in a case of CSI associated with provided assistance resources (e.g. sub-channel-based CSI reporting), a WTRU may include CSI reporting associated with assistance resources provided to another WTRU. According to embodiments, in a case of signal measurement of the assistance resources, such may be RSRP values for any or each assistance resource. According to embodiments, in a case of interference measurements of the assistance resources, such may be a RSSI value of any or each assistance resource. According to embodiments, in a case of indicating a grant-free resource, a WTRU may indicate the type of provided assistance resource set. For example, according to embodiments, a WTRU may indicate the assistance resources may be used in a grant-free manner (e.g., without resource reservation).

According to embodiments, assistance information may include an indication of a resource reservation associated with an assistance transmission (e.g., a resource reservation that may be re-selected, for example, according to the assistance information of/by the assisted WTRU. According to embodiments, for example, such an indication may include any of a L1 Destination ID and/or L1 Source ID, a L2 Destination and/or L2 Source ID, and a link ID.

According to embodiments, for example, as discussed above, an assisting WTRU may include information regarding (e.g., associated with) a transmission window associated with a resource set carried in an assistance transmission, and for example, such information may include any of T1 and T2. According to embodiments, any of T1 and T2 values (e.g., in slots) may be relative to the assistance transmission. According to embodiments, such T1 and/or T2 value may provide a reference timing to the assisted WTRU, for example, to interpret a resource set (e.g., correctly).

According to embodiments, there may be any number of assistance transmission types. According to embodiments, an assisting WTRU may perform an assistance transmission according to (e.g., based on) any of SL channels and signaling. For example, according to embodiments, an assisting WTRU may perform an assistance transmission according to (e.g., based on) any of the following SL channels and/or signaling (e.g. via a channel): a PSCCH (e.g. a stand-alone PSCCH), a PSFCH, a Physical SL Collision Indication Channel, a PSSCH (e.g., MAC CE signaling, RRC signaling, etc.), and a Physical SL Assistance Indication Channel.

According to embodiments, an assistance information transmission may be via (e.g., using, on, through, in, etc.) a (e.g., new) physical SL assistance indication channel. According to embodiments, a WTRU may send assistance information in a new SL PHY channel, such as, for example, a physical SL assistance indication channel. According to embodiments, such a (e.g., new) channel may have (e.g., include, consist of, comprise, make use of, be associated with, etc.) any number (e.g., types) of (e.g., different) indications (e.g., assistance indications). According to embodiments, such indication(s) may be determined according to any of: (1) an assistance request transmission, and a configuration (e.g., a pre-configuration) for each (e.g., per) resource pool. According to embodiments, an assistance indication may be (e.g., and/or include) any of: (1) a collision indication, (2) a half-duplex indication, (3) a PSFCH transmission indication, and (4) a UL transmission indication.

According to embodiments, a collision indication may indicate detection of a collision (e.g., a detected collision) with a SP-based resource reservation, for example, detected by a WTRU for which the assistance information is intended. For example, according to embodiments, the indication may be one bit and may be transmitted in a resource associated with a reserved resource that is between a collision detection and a next transmission instance of the resource reservation. According to embodiments, an assisted WTRU receiving such information (e.g., a collision indication) may trigger any of a pre-emption and resource reselection. According to embodiments, a half-duplex indication may indicate an upcoming SL transmission, and for example, may indicate non-reception slot(s). According to embodiments, a half-duplex indication may include a bit field, for example, to convey the index of the slot(s) of the non-reception slot(s). According to embodiments, an assisted WTRU, in case of receiving a half-duplex indication, may avoid SL transmission in the slot(s) (e.g., associated with (e.g., indicated in/by) the half-duplex indication.

According to embodiments, a PSFCH transmission indication may indicate an upcoming PSFCH transmission. According to embodiments, a PSFCH transmission indication may include a bit field, for example, to indicate whether a PSFCH transmission is reserved in the nearest PSFCH slot of a resource pool. According to embodiments, a PSFCH indication may include a PSFCH slot index of all reserved PSFCH transmissions. According to embodiments, an assisted WTRU, in a case of receiving such a PSFCH transmission indication, may avoid transmission of a PSSCH in (e.g., any) slots that may result in a PSFCH transmission in the indicated slot(s). In such a case, according to embodiments, an assisting WTRU may avoid dropping of a PSFCH, for example, due to multiple PSFCH transmissions in one slot. According to embodiments, a UL transmission indication may indicate an upcoming UL transmission. According to embodiments, a UL transmission indication may include a bit field, for example, to indicate a slot in which an UL transmission is scheduled. According to embodiments, an assisted WTRU, in a case of receiving a UL transmission indication, may avoid transmission of a PSSCH in (e.g., such) indicated slot(s). In such a case, according to embodiments, an assisting WTRU may avoid intra-WTRU interference, for example, interference from a UL transmission to (e.g., affecting, upon, etc.) SL reception.

According to embodiments, a WTRU may determine (e.g., select) resources for (e.g., associated with) an assistance transmission. According to embodiments, a WTRU may be configured (e.g., preconfigured) with a resource allocation, for example, (e.g., dedicated, only, specifically, etc.) for an assistance information transmission that may occur (e.g., via, using, be sent) on any of a PSSCH or a new PHY indication channel (e.g., as discussed above). According to embodiments, (e.g., such) a resource allocation may be any of a resource pool and a set of time and frequency resources allocated within a resource pool. According to embodiments, such resources may not be used for or by (e.g., any) other V2X data transmissions. According to embodiments, such time and/or frequency resources may be (e.g., consist of, comprise, include, have, etc.) any of a set of SL slots, a set of SL symbols, a set of sub-channels, a set of PRBs, and a set of sub-carriers. According to embodiments, such time and/or frequency resources may be configured as a separate region in/of a resource pool configured (e.g., preconfigured) for SL transmission.

According to embodiments, a WTRU may determine (e.g., select) resources for the assistance transmission according to an associated PSSCH transmission by an assisted WTRU. For example, according to embodiments, a WTRU may determine (e.g., select) resources for an initial assistance indication transmission according to resources used for a PSSCH transmission associated with indication information (e.g., such as indication information discussed above). According to embodiments, an indication channel, for example, having (e.g., with, including, etc.) a collision indication, may use resources associated with the resources of the PSSCH transmission for/in which the collision is detected. According to embodiments, a resource of the PSSCH transmission may be reserved via (e.g., using, in, by, etc.) a semi-persistent reservation. According to embodiments, such association of resources (e.g., such associated resources) may be determined according to any of the following: (1) a starting sub-channel and/or PRB index of a PSSCH transmission; (2) an index of a slot of the PSSCH transmission; (3) a WTRU source ID, and/or destination ID, of an assisted WTRU; (4) a SL ID of the SL link for which the assistance information is intended; and (5) total resources configured (e.g., preconfigured) for the assistance transmission.

According to embodiments, an assisting WTRU may determine a frequency resource of/for an initial assistance indication transmission, for example, within any of sub-channels and PRBs used for the PSSCH transmission. For example, according to embodiments, an indication channel may use any of the sub-channel and PRB of the lowest index of the PSSCH transmission. According to embodiments, any of a sub-channel and a PRB may be selected according to a modular function of any of (e.g., performed on/with) the WTRU ID (e.g., decimal format), an SL ID, and the total number of sub-channels and/or PRBs used in the PSSCH transmission. According to embodiments, a mapping for (e.g., of, between, etc.) a PSSCH sub-channel and/or PRBs may be configured with the dedicated frequency resources for the assistance indication channel. According to embodiments, a WTRU may determine a set of a sub-channels and/or PRBs according to an index of the slot and any of the starting sub-channel and the PRB index of the PSSCH transmission. According to embodiments, a WTRU may select any of a sub-channel and a PRB from a set a subchannels and/or PRBs according to any of a WTRU source/destination ID and a SL ID. According to embodiments, a WTRU may determine a PSFCH resource according to a PSSCH transmission (e.g., as specified according to 3GPP standards) and may transmit an initial assistance indication channel in the determined PSFCH resource.

According to embodiments, a WTRU may determine resources for an assistance transmission according to an association between resources used for assistance request and corresponding information transmissions. According to embodiments, a WTRU may perform an assistance transmission that includes (e.g., carries, indicates, etc.) requested information, for example, in a case where the WTRU receives an assistance request transmission. According to embodiments, a WTRU may determine resources used for an assistance information transmission according to a configured association for (e.g., with) the resources of the received corresponding assistance request. According to embodiments, such a configured (e.g., preconfigured) association may be indicated, for example, explicitly or implicitly (e.g., as discussed hereinbelow).

According to embodiments, there may be an explicit association between resources of an assistance request and information transmissions. According to embodiments, a WTRU may explicitly indicate a SL resource assignment reserved for an assistance information transmission in a SL PHY control channel, such as, for example, a SL PHY assistance request channel. According to embodiments, SL control information (SCI) may be carried in the assistance request channel and may include any of the following information: (1) an assistance request indication; (2) time and/or frequency resources assigned for a corresponding assistance information transmission; (3) any of a source ID and destination ID of the SL link for which the assistance request is intended.

According to embodiments, an assistance request indication may indicate (e.g., convey) any of a type of the requested assistance information and content of the requested assistance information. For example, According to embodiments, a WTRU may request assistance information including any of a collision indication, CSI, a sensing result, an interim sensing result, etc. According to embodiments, each code point of an SCI bit field may correspond to any of a configured type of the requested assistance information and a content of the requested assistance information.

According to embodiments, in a case of time and/or frequency resources assigned for a corresponding assistance information transmission, an assignment (e.g., of the time and/or frequency resources) may include multiple resources for any of initial transmissions and retransmissions. For example, according to embodiments, a time gap (e.g., in terms) of slots may be applied to indicate a time resource associated with (e.g., referring to, with reference to, etc.) to a slot in which the request channel is transmitted. According to embodiments, an index of any of a subchannel and PRB may be indicated for the frequency resource assignment. According to embodiments, in a case of assistance information parameters, a WTRU may provide sensing parameters (e.g., as discussed hereinabove). According to embodiments, a WTRU may indicate any of its buffer status and packet size for which the assistance information is intended.

According to embodiments, there may be an implicit association between resources of an assistance request and assistance information transmissions. According to embodiments, a WTRU may perform an assistance request transmission that may not include (e.g., without including) a resource assignment for a corresponding assistance information transmission. According to embodiments, there may be a case where a WTRU may transmit an assistance request via (e.g., using, in, over, etc.) a SL PHY assistance request channel, for example, according to a PHY signal (e.g. a ZC-based sequence). According to embodiments, a WTRU may transmit an assistance request in a SL PHY assistance request channel including a set of (e.g., above-discussed) bit fields, for example, without (e.g., except) the resource assignment for the corresponding assistance information transmission.

According to embodiments, an assisting WTRU may determine a SL slot for an initial assistance information transmission according to a timing offset (e.g. a number of slots) between an assistance request and a corresponding information transmission. According to embodiments, a timing offset may be configured (e.g., preconfigured) for each (e.g., per) type and/or content of the assistance information. For example, a collision indication may be configured with a smaller time gap than an available resource set. According to embodiments, a timing offset (e.g., time gap) may be configured as a fixed value, such as, for example, a number of slots that allow sufficient time for an assisting WTRU to generate the assistance information. According to embodiments, an assisting WTRU may determine frequency resources for an initial assistance information transmission according to any of the following parameters: (1) an index of any of sub-channels and PRBs in which the assistance request is received; (2) a type of assistance information indicated in an assistance request transmission; (3) any of a source ID and a destination ID of the SL link for which the assistance information is intended; (4) a link ID of the SL link for which the assistance information is intended; and (5) the total resources configured for the assistance transmission.

According to embodiments, an assisting WTRU may select any of a sub-channel and a PRB for an assistance transmission according to a configured (e.g., preconfigured) association between: (1) any of the sub-channel and the PRB used for the request transmission; and (2) the corresponding assistance transmission. According to embodiments, such an association (e.g., between (1) and (2)) may be a one-to-one mapping between the sub-channel and/or the PRB used for both transmissions. For example, according to embodiments, a WTRU may select any of the same sub-channel and the same PRB used for an assistance request transmission for a corresponding information transmission. According to embodiments, a WTRU may select (e.g., determine) a sub-channel that may include the PRB used for the associated request transmission. According to embodiments, an assisting WTRU may perform retransmission(s) of the assistance information according to a configured (e.g., preconfigured) pattern. According to embodiments, such a pattern may be (e.g., include, consist of, have, comprise, etc.) a sequence of time and/or frequency resources, for example, with a reference to the determined resource of the initial transmission.

According to embodiments, a WTRU may determine assistance information. According to embodiments, an assisting WTRU may determine a set of resources of (e.g., included in, indicated in, etc.) the assistant information according to any of: sensing and resource selection, CSI measurement, and collision detection. According to embodiments, an assisting WTRU may perform (e.g., two, any number of, etc.) sensing and resource selections. According to embodiments, two sensing and resource selections may include any of: sensing and resource selection for determining resources used for the assistance transmission; and sensing and resource selection for determining a set of resources for reporting in the assistance transmission.

According to embodiments, sensing and resource selection may be for (e.g., used by a WTRU) determining resources used for an assistance transmission. According to embodiments, an assisting WTRU may perform resource selection for the assistance transmission according to sensing. According to embodiments, an assisting WTRU may apply sensing parameters. According to embodiments, a sensing parameter of (e.g., applied by) an assisting WTRU may be a resource pool from which resources are to be reported. For example, an assisting WTRU may select resources from a resource pool dedicated to assistance transmission.

According to embodiments, a sensing parameter of (e.g., applied by) an assisting WTRU may be an L1 priority. According to embodiments, an L1 priority of an assistance transmission may be (pre) configured. For example, the L1 priority may be set at the highest priority. According to embodiments, an L1 priority of an assistance transmission may be the same as that of a TB carried in the same transmission. According to embodiments, a sensing parameter of (e.g., applied by) an assisting WTRU may be a remaining PDB. According to embodiments, a remaining PDB of an assistance transmission may be (pre) configured. For example, any of a fixed value and small value may be (pre) configured. According to embodiments, an assisting WTRU may determine a latency bound for an assistance transmission based on, for example, a remaining PDB. According to embodiments, an assisting WTRU may determine a latency bound for an assistance transmission based on, for example, a remaining PDB. According to embodiments, a remaining PDB of an assistance transmission request may be the same as that of the TB carried in the same transmission. According to embodiments, a sensing parameter of (e.g., applied by) an assisting WTRU may be a number of sub-channels (e.g., to be) used for an assistance transmission.

According to embodiments, an assisting WTRU may determine any of a T1_assist and a T2_assist for the assistance transmission request. According to embodiments, a T1_assist may be determined according to (e.g., based on) WTRU processing. According to embodiments, a T2_assist may be determined according to a pre) configuration. That is, according to embodiments, a fixed value (e.g., for a) T2_assist may be (pre) configured for an assistance transmission request. According to embodiments, a T2_assist may be determined according to a remaining PDB of a TB. According to embodiments, a T2_assist may be determined according to a period of the associated resource reservation. According to embodiments, an assisting WTRU may select a T2_assist, for example, to ensure the assisted WTRU may have sufficient time to receive the assistance transmission and re-select resources based on the received assistance resource set. According to embodiments, for example, as shown in FIG. 4, when T1_TB is applied for sensing of a resource set, an assisting WTRU may set a T2_assist before T1_TB−Toffset.

According to embodiments, sensing and resource selection may be performed, for example, to determine a set of resources to report in an assistance transmission. According to embodiments, an assisting WTRU may determine any number of sensing parameters. According to embodiments, an assisting WTRU may determine sensing parameters according to any of: (1) a (pre) configuration of (e.g., specific to) a resource pool; (2) L1 priorities indicated in a (e.g., previous) transmission received from an assisted WTRU; (3) a number of sub-channels of (e.g., previous) transmissions received from an assisted WTRU; (4) an RRC configuration (e.g., received, used) during link establishment from the assisted WTRU; and (5) parameters included in an assistance request received from an assisted WTRU. According to embodiments, an assisting WTRU may determine sensing parameters according to a received assistance transmission request content, for example, as discussed above.

According to embodiments, an assisting WTRU may determine sensing parameters according to a (e.g., previous) transmission received from an assisted WTRU. For example, according to embodiments, an assisting WTRU may apply any of the number of sub-channels and a L1 priority of a previous transmission.

According to embodiments, assistance resources of (e.g., resources for, used in, indicated by/in, etc.) the assistance resource set may be determined, for example, by a WTRU. According to embodiments, assistance resources may include the set of available resources, for example, which may be determined according to a sensing procedure. For example, according to embodiments, an assisting WTRU may provide a set of assistance resources according to (e.g., based on, from among, etc.) a set A that is determined according to (e.g., is a result of) a sensing procedure. According to embodiments, in such a case, each assistance resource may be a candidate resource specified for the sensing procedure. According to embodiments, an assistance resource (e.g., a candidate resource) may be a time/frequency resource occupying any of: a single slot, and any set of (e.g., a specified, a number of) contiguous sub-channels used in sensing included in (e.g., for) a corresponding resource pool within a corresponding resource pool and within an associated transmission window.

According to embodiments, assistance resources may include a set of unavailable resources for transmission. For example, according to embodiments, a peer WTRU in any of a unicast and groupcast may indicate a set of unavailable slots (e.g., a set of slots the peer WTRU may use, require, need, reserve, etc., to perform transmission) to an assisted WTRU. According to embodiments, an assisted WTRU may avoid selecting (e.g., may not select) a transmission resource included in a set of slots indicated by assisting WTRUs.

According to embodiments, a WTRU may determine a transmission window associated with an assistance resource set. According to embodiments, resources in an assistance resource set may be indexed, for example, according to (e.g., a total, an amount of) candidate resources in an associated transmission window. According to embodiments, (e.g., in a case of indexing an assistance resource set) both an assisting WTRU and an assisted WTRU may have (e.g., need, require, etc.) a same interpretation of a time and frequency resource based on the index of the resource in the assistance resource set. According to embodiments, for example, in order to have (e.g., achieve) such a same interpretation, both the assisting WTRU and the assisted WTRU may (e.g., should, shall, must, etc.) have the same understanding of the start and the end of a transmission window.

According to embodiments, an assisting WTRU may receive an explicit indication, for example, including any of T1_TB and T2_TB, in an assistance transmission request. According to embodiments, any of T1_TB and T2_TB may be an absolute frame, sub-frame, or slot number. According to embodiments, an indication value may be an offset (e.g., in slots) relative to the timing of the assistance transmission request. According to embodiments, such timing (e.g., such a time) may be common to both the assisting WTRU and the assisted WTRU and may (e.g., can, will) not cause ambiguity in interpreting the window start, the window end, and the resource indexing. According to embodiments, an assisting WTRU may determine a T2_TB according to a remaining PDB included in an assistance transmission request.

According to embodiments, an assisting WTRU may determine an T1_TB according to any of: a T2_assistTX (e.g., T2 of an assistance transmission); a (pre) configured offset (e.g., slots) between the T2_assistTX and T1_TB; a timing of an assistance transmission; and a timing of an assistance transmission request. For example, according to embodiments, an assisting WTRU may determine T1_TB=T2_assistTX+offset, and thereby the transmission window of [n+T1_TB, n+T2_TB], where n may refer to a timing (e.g., slot) of an assistance transmission request. According to embodiments, an (e.g., (pre) configured) offset may (e.g., shall, must, needs to, etc.) allow sufficient time for the assisted WTRU to perform WTRU processing for receiving the assistance transmission and performing a resource selection based on the received assistance transmission.

According to embodiments, an assisting WTRU may determine a transmission window according to any of a reserved transmission timing and a pre-defined transmission window. For example, according to embodiments, an assisting WTRU may perform an assistance transmission (e.g., including information) providing a resource set for an upcoming transmission by an assisted WTRU in a slot, such as slot X. According to embodiments, an assisting WTRU may determine a transmission window according to any of: a reserved time resource (e.g. slot X); and a (pre) configured transmission window relative to the reserved time resource, such as, for example a transmission window starting at slot X with a (pre) configured duration (e.g., slots). According to embodiments, a transmission window may end at slot X with a (pre) configured duration (e.g., slots).

According to embodiments, (e.g., any of) the above-discussed determinations and/or (e.g., associated) parameters may be common to both an assisting WTRU and an assisted WTRU, for example, so that both WTRUs may have the same understanding of the start and the end of a transmission window. According to embodiments, for example, as a result of having such same understanding, the assisted WTRU may interpret (e.g., correctly) resources in a provided resource set according to an indexing. According to embodiments, an assisting WTRU may determine a proportion of resources of a (e.g., total) candidate resources of (e.g., within) a transmission window that may be included in a set of resources reported to an assisted WTRU. According to embodiments, an assisting WTRU may determine such a proportion of resources of the total candidate resources within a transmission window according to any of: (1) (pre) configuration (e.g., a proportion may be fixed at X %, where X may equal to 20); (2) a QoS requirement (e.g., a proportion may be X % where X may be based on L1 priority); and (3) an indication in a received assistance transmission request.

According to embodiments, a (e.g., any) number of assistance resources of a set may be (pre) configured to be associated with a (e.g., specific) resource pool. According to embodiments, such a number (e.g., of assistance resources of a set) may be included (e.g., signaled) in an RRC configuration, for example, during link establishment. According to embodiments, such a number may be indicated in an assistance request from an assisted WTRU.

According to embodiments, a WTRU may determine assistance information in a case of being triggered by CSI reporting. According to embodiments, an assisting WTRU may include CSI information (e.g. any of a CQI and a RI), for example, along with a resource set, in an assistance transmission. According to embodiments, an assisting WTRU may determine a set of assistance resources according to a CSI measurement of (e.g., the) resources. According to embodiments, an assisting WTRU may include assistance resources in which the measured CSI value (e.g. CQI) exceeds a (e.g., (pre) configured, CQI, etc.) threshold. According to embodiments, an assisting WTRU may receive a CQI threshold in a assistance request from an assisted WTRU. According to embodiments, (e.g., in addition, to above discussed features) an assisting WTRU may include a set resources for which a measured CQI is above any of an average CQI value or a median CQI value, for example, obtained over all measured resources in a determined transmission window. According to embodiments, in a case where a size of a set of assistance resources is fixed, an assisting WTRU may include certain assistance resources, for example, in which measured CQI values are highest.

According to embodiments, a WTRU may determine assistance information in a case of any of a collision detection and a HARQ NACK. According to embodiments, a WTRU may include collision information in a PSFCH transmission, for example, in a case where HARQ is enabled for transmission(s) corresponding to a resource reservation on which a collision is detected. According to embodiments, for example, a PSFCH format may include a bit field indicating a collision detected at a resource of a PSSCH associated with a HARQ ACK/NACK carried in a PSFCH. According to embodiments, in such a case, the WTRU may transmit any of or both the HARQ ACK/NACK information and the associated collision detection indication in a PSFCH.

According to embodiments, a WTRU may send a collision indication in a SL PHY channel (e.g. a physical SL collision indication channel), such that, for example, a physical SL collision indication channel may carry one-bit information (e.g., a collision indication). According to embodiments, a channel may be sequence-based, for example, according to a (e.g., (pre) defined) sequence to indicate any of a collision detection and/or no collision detection. According to embodiments, such sequences may be according to (e.g., based on) ZC sequence with two (pre) defined cyclic shifts. According to embodiments, a resource of a physical SL collision indication channel may be (e.g., implicitly) associated with a PSSCH resource, for example, a PSSCH resource in which the indicated collision is detected. According to embodiments, in a case where a collision indication is based on consecutive collision detections (e.g., as discussed above), a resource may be (e.g., implicitly) associated with a last PSSCH resource. According to embodiments, an assisting WTRU may include a collision detection indication with a resource set in an assistance transmission, for example, according to (e.g., based on) any of MAC CE signalling and RRC signalling. According to embodiments, a WTRU may transmit a physical SL collision indication channel periodically. According to embodiments, a WTRU may transmit a physical SL collision indication channel triggered by a collision detection (e.g., as discussed above).

According to embodiments, there may be an indication of (e.g., for a) collision with a VRU transmission. According to embodiments, a WTRU may identify (e.g., detect, determine, sense, etc.) a collision with a VRU transmission, for example, according to a WTRU type indication (e.g., included, carried, informed, indicated, etc.) in SCI. For example, according to embodiments, a WTRU type indication in SCI may include a value corresponding to (e.g., information indicating) a VRU transmission. According to embodiments, in a case where a WTRU detects a collision with VRU transmission, the WTRU may send a collision indication indicating (e.g., conveying, informing, including, etc.) the information. According to embodiments, a collision indication may be included in a PHY control channel, and the collision indication may be configured with a set of values, wherein at least one of the values may indicate (e.g., may correspond to and/or be associated with an indication of) collision with a VRU transmission.

According to embodiments, in a case where an assisted WTRU receives (e.g., such) a collision indication, the assisted WTRU may not consider the priority of the collided transmission and may determine to perform any of pre-emption and resource reselection. According to embodiments, performing any of pre-emption and resource reselection may prioritize (e.g., allow for prioritization of) a VRU transmission, for example, because a (e.g., certain) VRU may have a hardware (e.g., software, physical, etc.) constraint (e.g. the VRU may not have a receiver), and the VRU (e.g., as a result of the constraint) may not (e.g., be able to) detect collisions. According to embodiments, in a case where an assisted WTRU receives a collision indication value associated with (e.g., corresponding to, indicating, etc.) a collision with another VRU, the assisted WTRU may determine to perform any of pre-emption and resource reselection, for example, according to (e.g., based on) a priority value of the transmission.

According to embodiments, a WTRU may perform operations and/or features in a case of receiving an assistance transmission. According to embodiments, an assisted WTRU may select an (e.g., determine which, any, any number of, any type of, etc.) assistance message to use (e.g., to process, etc.), for example, for and/or associated with an (e.g., any number of) assistance transmission(s).

According to embodiments, an assisted WTRU may receive any number of (e.g., a plurality of, multiple) assistance messages from any number of (e.g., different) WTRUs. According to embodiments, an assisted WTRU may determine to use (e.g., to process, to select resources according to, etc.) any number of the received assistance messages. According to embodiments, an assisted WTRU may determine which (e.g., select any number of) received assistance messages to use according to any of a source ID of an assistance message, a destination ID of the assistance message, and a destination ID of a TB. That is, according to embodiments, in a case of one unicast link, an assisted WTRU may select the assistance message from a peer WTRU for its unicast transmission with the peer WTRU. According to embodiments, in a case of a groupcast transmission, an assisted WTRU may select an assistance message from a WTRU within its group. According to embodiments, an assisted WTRU may determine which (e.g., select any number of) received assistance messages to use according to a timing of an assistance message. For example, according to embodiments, an assisted WTRU may use an assistance message in a case where a time gap between the assistance message and a TB arrival is smaller than a threshold, for example, which may be determined according to a PDB of the TB.

According to embodiments, an assisted WTRU may perform resource selection (e.g., select an assistance resource). According to embodiments, an assisted WTRU may select a (e.g., an assistance) resource, for example, from among a set of assistance resources according to any of random selection and CSI reporting.

According to embodiments, an assisted WTRU may receive (e.g., information indicating/identifying) a set of available resources, for example, from an assisting WTRU. According to embodiments, in a case of receiving a set of available resources from an assisting WTRU, an assisted WTRU may perform sensing, for example, for determining a set of available resources (e.g., during/after the sensing procedure). According to embodiments, an assisted WTRU may determine a set of available resources according to a combination of the available resources from its sensing procedure and the set of available resources determined according to (e.g., signaled in, indicated by, from, received, etc.) assistance information. According to embodiments, an assisted WTRU may determine a set of available resources according to an intersection between a set of available resources determined according to its sensing and a set of available resources determined according to assistance information.

According to embodiments, an assisted WTRU may receive a set of unavailable resources, for example, from an assisting WTRU. According to embodiments, an assisted WTRU, for example, in a case of receiving a set of unavailable resources, may (e.g., then) exclude all (e.g., indicated, received, etc.) unavailable resources during any of a sensing procedure and a resource (re) selection procedure. According to embodiments, a set of unavailable resources may be determined as a set of transmission slots associated with (e.g., of, used by, etc.) an assisting WTRU. According to embodiments, an assisted WTRU may determine to exclude any of the unavailable resources for transmissions of a TB associated with the assisting WTRU.

According to embodiments, an assisted WTRU may receive a collision indication from an assisting WTRU. According to embodiments, a resource collision indication (e.g., received from an assisting WTRU) may indicate a (e.g., potential) collision of any number of (e.g., reserved) resources. According to embodiments, for example, in a case of receiving a resource collision indication, a (e.g., assisted) WTRU may determine to trigger resource selection/reselection.

According to embodiments, an assisted WTRU may receive assistance information from any number of (e.g., multiple, more than one, etc.) assisting WTRUs. According to embodiments, an assisted WTRU may receive assistance information from any number of assisting WTRUs. According to embodiments, a WTRU may simultaneously (e.g., jointly, together, in parallel, etc.) process the received assistance information and the WTRU's (e.g., own) sensing result, and may determine a superset of combined assistance information. According to embodiments, a superset of the resources (e.g., associated with the superset of combined assistance information) may be a value (e.g., certain percentage, X, X %, etc.) of total resources within a transmission window determined by a configured process time and PDB of the SL TB. According to embodiments, such a value (e.g., certain percentage, X, may be configured (e.g., preconfigured) per QoS requirement (e.g., per priority, per resource pool, etc.).

According to embodiments, a WTRU may determine a candidate resource set according to (e.g., based on) a superset of any of available resources and preferred resources. According to embodiments, (e.g., such) a superset (e.g., of available and/or preferred resources) may be determined according to (e.g., based on) any of: (1) a number of resource sets in which an assistance resource is included; and (2) any of an averaged RSRP and a L1 priority of a candidate resource included in the assistance information.

According to embodiments, in a case of a superset determined according to a number of resource sets in which an assistance resource is included, such resource sets may include any of received assistance resource sets and a resource set (e.g., set A) determined by sensing. According to embodiments, an (e.g., each) assistance resource set may include any of available resources and preferred resources, for example, determined by any (e.g., each) assisting WTRU. According to embodiments, an assisted WTRU may count a number of resource sets in which a candidate resource is included. According to embodiments, an assisted WTRU may rank all resources according to (e.g., based on) the count in a descending order and may include the first percentage (e.g., X %) of the resources in a superset of the candidate resources for TB transmission. According to embodiments, a superset may (e.g., thus) include resources that most WTRUs identify as available and/or preferred.

According to embodiments, in a case of a superset determined according to any of an averaged RSRP and a L1 priority of a candidate resource included in the assistance information, an assisted WTRU may process all of any of available resources and preferred resources in all received assistance resource sets jointly (e.g., simultaneously) with its own sensing. For example, according to embodiments, an assisted WTRU may compute an average RSRP of a candidate resource according to (e.g., based on) RSRPs reported for the same resource and may exclude resources having (e.g., with) an average RSRP higher than a certain value (e.g., configured/preconfigured threshold). According to embodiments, such a value (e.g., threshold) may be configured per L1 priority pair, so that, for example, a priority of a TB to be transmitted by the assisted UE and a decoded priority associated with (e.g., a priority decoded in) a candidate resource. According to embodiments, a WTRU may determine (e.g., select, be informed of) a candidate resource set according to (e.g., based on) a superset of unavailable resources included in (e.g., indicated by) the received assistance resource sets and the WTRU's own sensing result, such as, for example, set A. According to embodiments, an assisted WTRU may exclude any of or all of received unavailable resources from set A.

According to embodiments, an assisted WTRU may determine (e.g., whether, a need, a requirement, etc.) to perform resource (re-) evaluation. According to embodiments, an assisted WTRU may determine whether it needs to perform resource (re-) evaluation (e.g., or not) any of the following. According to embodiments, an assisted WTRU may determine (e.g., whether, a need, a requirement, etc.) to perform resource (re-) evaluation according to any of a timing of assistance information message and a remaining PDB of a TB. According to embodiments, for example, a WTRU may determine not to perform resource (re-) evaluation in a case where a remaining PDB of a TB, after receiving an assistance information message, is smaller than a threshold. According to embodiments, in a case where a remaining TB of a PDB does not exceed a threshold, an assisted WTRU may perform resource (re-) evaluation.

According to embodiments, an assisted WTRU may determine (e.g., whether, a need, a requirement, etc.) to perform resource (re-) evaluation according to any of an amount of assistance resources (e.g., a total number of any of transmission resources and slots) and a window of assistance resources. For example, according to embodiments, an assisted WTRU may determine not to perform resource (re-) evaluation in a case where any of a number of assistance resources and an assistance resources window size is smaller than a (e.g., respective) threshold. According to embodiments, in a case where such a threshold is not exceeded, an assisted WTRU may perform resource (re-) evaluation. According to embodiments, such an approach for resource (re-) evaluation may allow for a WTRU to have (e.g., enough) resources for (re) selection. According to embodiments, an assisted WTRU may determine (e.g., whether, a need, a requirement, etc.) to perform resource (re-) evaluation according to any of a QoS of a TB and a CBR of a resource pool. For example, according to embodiments, an assisted WTRU may determine to perform resource (re-) evaluation for any of high priority TBs and in high measured CBR, and the assisted WTRU may determine not to perform resource (re-) evaluation for any of a low priority TB and a low measured CBR.

According to embodiments, an assisted WTRU may determine (e.g., whether) to use assistance information, for example, from an assisting WTRU. According to embodiments, an assisted WRTU may determine whether it uses assisting information (e.g., a set of available resources sent from an assisting WTRU) according to a distance between an assisting WTRU and the assisted WTRU. According to embodiments, an assisted WRTU may determine whether it uses assisting information (e.g., a set of available resources sent from an assisting WTRU) according to a received signal strength, for example, from an assisting WTRU. According to embodiments, an assisted WRTU may determine whether it uses assisting information (e.g., a set of available resources sent from an assisting WTRU) according to a CBR of a resource pool. According to embodiments, for example, a WTRU may determine not to any of use and decode the assistance information, for example, in a case where a CBR is smaller than a threshold. According to embodiments, such an assisted WRTU may determine to use the assistance information in a case where a CBR is larger than a threshold. According to embodiments, an assisted WRTU may determine whether it uses assisting information (e.g., a set of available resources sent from an assisting WTRU) according to a QoS of a TB. For example, according to embodiments, a WTRU may determine to use and/or decode assistance information in a case where a priority of a TB is greater than a threshold, and otherwise, it may not use the assistance information. According to embodiments, an assisted WRTU may determine whether it uses assisting information (e.g., a set of available resources sent from an assisting WTRU) according to a timing of receiving the assistance information.

According to embodiments, an assisted WTRU may determine any of a distance between a assisting WTRU and itself and a received signal strength from the assisting WTRU. According to embodiments, an assisted WTRU may determine whether it uses assistance information sent from a assisting WTRU according to a distance between the assisting WTRU and the assisted WTRU. For example, according to embodiments, in a case where the distance between an assisting WTRU and an assisted WTRU is smaller than a (e.g., distance) threshold, the assisted WTRU may use the assistance information received from the assisting WTRU; and otherwise, the assisted WTRU may not use the assistance information.

According to embodiments, a (e.g., distance) threshold may be determined according to any of a variety of methods, parameters, and/or features, for example, such as discussed below. one or any combination of the following. According to embodiments, a (e.g., distance) threshold may be determined according to a minimum communication range (MCR), for example, indicated in an assistance message. For example, according to embodiments, an assisting WTRU may indicate a MCR to use, for example, in its assistance information. According to embodiments, an assisted WTRU may determine a distance threshold according to (e.g., as) the MCR indicated by the assisting WTRU. According to embodiments, a (e.g., distance) threshold may be determined according to a QoS of a TB. For example, according to embodiments, a WTRU may be configured with a mapping between a (e.g., any number of) distance threshold and a (e.g., any number of) priority of a TB. According to embodiments, such a WTRU may (e.g., then) determine a distance threshold according to (e.g., the mapping of) a QoS of the TB (e.g., any of the priority, latency, and/or reliability of the TB). According to embodiments, a (e.g., distance) threshold may be determined according to a CBR of a resource pool.

For example, according to embodiments, a WTRU may be configured with a mapping between a (e.g., any, each) CBR range and a (e.g., one, any, each) distance threshold. According to embodiments, such a WTRU may (e.g., then) determine a distance threshold according to a measured CBR of the resource pool.

According to embodiments, a WTRU may determine a received signal strength, for example, for a signal received from an assisting WTRU. According to embodiments, an assisted WTRU may determine to use (e.g., whether it uses) assistance information according to a received signal strength (e.g., any of a RSSI and a RSRP) of a message (e.g., a signal) associated with assistance information. For example, according to embodiments, in a case where a received signal strength is smaller than a threshold, an assisted WTRU may use the assistance information (e.g., from the assisting WTRU). Otherwise, in a case where the received signal strength does not exceed a threshold, the assisted WTRU may not use such assistance information.

According to embodiments, a received signal strength threshold may be determined according to any of a transmission power and a minimum received signal strength threshold indicated by an assisting WTRU. According to embodiments, a received signal strength threshold may be determined according to a QoS of a TB. For example, according to embodiments, a WTRU may be (pre-) configured with a mapping of a (e.g., one, each, any, etc.) minimum received signal strength threshold to any of a (e.g., one, each, any, etc.) priority and a reliability value of a TB. According to embodiments, such a WTRU may (e.g., then) determine (e.g., whether) to use the assistance information according to any of the transmission TB and its measured received signal strength. According to embodiments, a received signal strength threshold may be determined according to a CBR of a resource pool. For example, according to embodiments, a WTRU may be configured with a mapping between each CBR range and a received signal strength threshold. According to embodiments, such a WTRU may (e.g., then) determine a received signal strength threshold, for example, according to a measured CBR of the resource pool.

According to embodiments, a WTRU may determine a transmission time of (e.g., for) assistance information. According to embodiments, an assisted WTRU may determine (e.g., whether) to any of decode and use the assistance information, for example, according to a transmission time of assistance information. For example, according to embodiments, an assisted WTRU may decide not to any of decode or use the assistance information for an amount of time T (e.g., a period, T slots, etc.) before a transmission resource. According to embodiments, a value of T may be determined according to any of: (e.g., a (pre-) configuration in) a resource pool; a capacity of a WTRU; a QoS of a TB; and a CBR of a resource pool.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A first wireless transmit/receive unit (WTRU) comprising a processor and memory, wherein the processor and memory are configured to:
   receive a resource information request from a second WTRU, the resource information request comprising an indication of a priority associated with a transmission to be performed by the second WTRU, an indication of a start and an end of a time window associated with the transmission to be performed by the second WTRU, and an indication of a number of sub-channels associated with the transmission to be performed by the second WTRU;
   determine a set of one or more resources based on the indicated priority, the start and the end time of the time window, and the number of sub-channels, wherein the set of one or more resources comprises one or more resources that the first WTRU has determined are available for use by the second WTRU for the transmission to be performed by the second WTRU;
   determine an assistance information resource for transmitting assistance information to the second WTRU, wherein the assistance information comprises an indication of the set of one or more resources; and
   transmit a medium access control (MAC) control element (CE) or sidelink control information (SCI) comprising the assistance information to the second WTRU using the assistance information resource.

2. The first WTRU of claim 1, wherein the assistance information comprises an indication of a resource type.

3. The first WTRU of claim 2, wherein the resource type indicates that one or more resources of the set of one or more resources are preferred resources.

4. The first WTRU of claim 1, wherein the processor and memory are configured to determine that the one or more resources of the set of one or more resources are available for use by the second WTRU based on sensing a set of candidate resources.

5. The first WTRU of claim 4, wherein the sensing comprises determining a reference signal received power (RSRP) measurement for one or more candidate resources of the set of candidate resources.

6. The first WTRU of claim 5, wherein the sensing comprises comparing the RSRP measurement to a threshold.

7. The first WTRU of claim 6, wherein the processor and memory are configured to determine the threshold based on the indication of the priority comprised in the resource information request.

8. The first WTRU of claim 7,
   wherein the indication of the priority comprised in the resource information request indicates a layer one (L1) priority associated with the transmission to be performed by the second WTRU,
   wherein the L1 priority is set to a highest priority,
   and wherein the processor and memory are further configured to:
      determine a weighting coefficient based on the L1 priority;
      apply the weighting coefficient to an RSRP value;
      and determine the threshold based on the weighting coefficient.

9. A method to be performed by a first wireless transmit/receive unit (WTRU), the method comprising:
   receiving a resource information request from a second WTRU, the resource information request comprising an indication of a priority associated with a transmission to be performed by the second WTRU, an indication of a start and an end of a time window associated with the transmission to be performed by the second WTRU, and an indication of a number of sub-channels associated with the transmission to be performed by the second WTRU;
   determining a set of one or more resources based on the indicated priority, the start and the end time of the time window, and the number of sub-channels, wherein the set of one or more resources comprises one or more resources that the first WTRU has determined are available for use by the second WTRU for the transmission to be performed by the second WTRU;
   determining an assistance information resource for transmitting assistance information to the second WTRU, wherein the assistance information comprises an indication of the set of one or more resources; and
   transmitting a medium access control (MAC) control element (CE) or a sidelink control information (SCI) comprising the assistance information to the second WTRU using the assistance information resource.

10. The method of claim 9, wherein the assistance information comprises an indication of a resource type.

11. The method of claim 10, wherein the resource type indicates that one or more resources of the set of one or more resources are preferred resources.

12. The method of claim 9, further comprising:
determining that the one or more resources of the set of one or more resources are available for use by the second WTRU based on sensing a set of candidate resources.

13. The method of claim 12, wherein the sensing comprises determining a reference signal received power (RSRP) measurement for one or more candidate resources of the set of candidate resources.

14. The method of claim 13, wherein the sensing comprises comparing the RSRP measurement to a threshold.

15. The method of claim 14, further comprising:
determining the threshold based on the indication of the priority comprised in the resource information request.

16. The method of claim 15,
wherein the indication of the priority comprised in the resource information request indicates a layer one (L1) priority associated with the transmission to be performed by the second WTRU,
wherein the L1 priority is set to a highest priority,
and further comprising:
determining a weighting coefficient based on the L1 priority;
applying the weighting coefficient to an RSRP value;
and determining the threshold based on the weighting coefficient.

* * * * *